(12) United States Patent
McCormick

(10) Patent No.: US 12,104,443 B2
(45) Date of Patent: Oct. 1, 2024

(54) DEVICE FOR CENTERING A SENSOR ASSEMBLY IN A BORE

(71) Applicant: PETROMAC IP LIMITED, Auckland (NZ)

(72) Inventor: Stephen Peter McCormick, Auckland (NZ)

(73) Assignee: PETROMAC IP LIMITED, Auckland (NZ)

( * ) Notice: Subject to any disclaimer, the term of this patent is extended or adjusted under 35 U.S.C. 154(b) by 0 days.

(21) Appl. No.: 18/042,005

(22) PCT Filed: Aug. 13, 2021

(86) PCT No.: PCT/NZ2021/050131
§ 371 (c)(1),
(2) Date: Feb. 17, 2023

(87) PCT Pub. No.: WO2022/039603
PCT Pub. Date: Feb. 24, 2022

(65) Prior Publication Data
US 2023/0323741 A1    Oct. 12, 2023

(30) Foreign Application Priority Data
Aug. 19, 2020  (NZ) ........................ 767264

(51) Int. Cl.
*E21B 17/10*    (2006.01)
*E21B 47/01*    (2012.01)
*G01V 11/00*    (2006.01)

(52) U.S. Cl.
CPC ...... *E21B 17/1021* (2013.01); *E21B 17/1057* (2013.01); *E21B 47/01* (2013.01); *G01V 11/005* (2013.01)

(58) Field of Classification Search
CPC .... E21B 17/021; E21B 17/1057; E21B 47/01; E21B 17/10; G01V 11/005
See application file for complete search history.

(56) References Cited

U.S. PATENT DOCUMENTS

| 4,557,327 A | 12/1985 | Kinley et al. |
| 4,619,322 A | 10/1986 | Armell et al. |

(Continued)

OTHER PUBLICATIONS

Australian Patent Office, International Search Report, PCT/NZ2021/050131, Sep. 20, 2021, 4 pages.

(Continued)

*Primary Examiner* — Taras P Bemko
(74) *Attorney, Agent, or Firm* — DANN, DORFMAN, HERRELL and SKILLMAN, P.C.

(57) ABSTRACT

A device for centering a sensor assembly in a bore comprises a plurality of arm assemblies connected first and second support members. Each arm assembly comprises a first arm pivotally connected to the first support member, a second arm pivotally connected to the second support member, and a third arm pivotally connected between the first and second arms. The third arm is pivotally connected to a third support member positioned axially between the first and second support members. The third arm extends across the longitudinal axis of the device so that in use each arm assembly contacts opposite sides of the bore to centralise the sensor assembly in the bore.

20 Claims, 15 Drawing Sheets

(56) References Cited

U.S. PATENT DOCUMENTS

| | | | |
|---|---|---|---|
| 4,862,808 A * | 9/1989 | Hedgcoxe | B62D 61/10 |
| | | | 105/365 |
| 5,358,040 A | 10/1994 | Kinley et al. | |
| 5,574,263 A | 11/1996 | Roesner | |
| 5,971,404 A | 10/1999 | Stoves | |
| 7,505,063 B1 | 3/2009 | Bastedo et al. | |
| 8,919,209 B2 | 12/2014 | Furlong | |
| 9,772,060 B2 * | 9/2017 | Bichler | F16L 55/44 |
| 9,863,198 B2 | 1/2018 | McCormick | |
| 9,963,954 B2 | 5/2018 | Al-Mulhem | |
| 2003/0145985 A1 | 8/2003 | Stuart-Bruges et al. | |
| 2006/0067162 A1 | 3/2006 | Blankinship et al. | |
| 2006/0180318 A1 * | 8/2006 | Doering | E21B 17/1021 |
| | | | 166/207 |
| 2006/0266134 A1 * | 11/2006 | MacMillan | F16L 55/30 |
| | | | 73/865.8 |
| 2007/0181298 A1 | 8/2007 | Sheiretov et al. | |
| 2008/0098834 A1 * | 5/2008 | Sergoyan | F16L 55/32 |
| | | | 73/866.5 |
| 2012/0048542 A1 | 3/2012 | Jacob | |
| 2013/0068479 A1 * | 3/2013 | AlDossary | E21B 4/18 |
| | | | 166/381 |
| 2014/0238659 A1 | 8/2014 | Wheater et al. | |
| 2015/0308207 A1 * | 10/2015 | McCormick | E21B 17/10 |
| | | | 104/138.2 |
| 2016/0123143 A1 | 5/2016 | Shaobin | |
| 2016/0298396 A1 | 10/2016 | Church | |
| 2019/0383108 A1 | 12/2019 | Massey et al. | |
| 2020/0362645 A1 | 11/2020 | Donzier et al. | |

OTHER PUBLICATIONS

Australian Patent Office, Written Opinion, PCT/NZ2021/050131, Sep. 20, 2021, 2 pages.

* cited by examiner

SECTION H-H  SECTION I-I  SECTION J-J  SECTION K-K  SECTION L-L

DEVICE FOR CENTERING A SENSOR ASSEMBLY IN A BORE

TECHNICAL FIELD

This invention relates to devices for use in centering sensor equipment down a bore such as a pipe, a wellbore or a cased wellbore, and in particular to devices for use in centering sensor equipment in wireline logging applications.

BACKGROUND

Hydrocarbon exploration and development activities rely on information derived from sensors which capture data relating to the geological properties of an area under exploration. One approach used to acquire this data is through wireline logging. Wireline logging is performed in a wellbore immediately after a new section of hole has been drilled, referred to as open-hole logging. These wellbores are drilled to a target depth covering a zone of interest, typically between 1000-5000 meters deep. A sensor package, also known as a "logging tool" or "tool-string" is then lowered into the wellbore and descends under gravity to the target depth of the wellbore well. The logging tool is lowered on a wireline—being a collection of electrical communication wires which are sheathed in a steel cable connected to the logging tool. The steel cable carries the loads from the tool-string, the cable itself, friction forces acting on the downhole equipment and any overpulls created by sticking or jamming. Once the logging tool reaches the target depth it is then drawn back up through the wellbore at a controlled rate of ascent, with the sensors in the logging tool operating to generate and capture geological data.

Wireline logging is also performed in wellbores that are lined with steel pipe or casing, referred to as cased-hole logging. After a section of wellbore is drilled, casing is lowered into the wellbore and cemented in place. The cement is placed in the annulus between the casing and the wellbore wall to ensure isolation between layers of permeable rock layers intersected by the wellbore at various depths. The cement also prevents the flow of hydrocarbons in the annulus between the casing and the wellbore which is important for well integrity and safety. Oil wells are typically drilled in sequential sections. The wellbore is "spudded" with a large diameter drilling bit to drill the first section. The first section of casing is called the conductor pipe. The conductor pipe is cemented into the new wellbore and secured to a surface well head. A smaller drill bit passes through the conductor pipe and drills the surface hole to a deeper level. A surface casing string is then run in hole to the bottom of the hole. This surface casing, commonly 20" (nominal OD) is then cemented in place by filling the annulus formed between the surface casing and the new hole and conductor casing. Drilling continues for the next interval with a smaller bit size. Similarly, intermediate casing (e.g. 13⅜") is cemented into this hole section. Drilling continues for the next interval with a smaller bit size. Production casing (e.g. 9⅝" OD) is run to TD (total depth) and cemented in place. A final casing string (e.g. 7" OD) is cemented in place from a liner hanger from the previous casing string. Therefore, the tool-string must transverse down a cased-hole and may need to pass into a smaller diameter bore.

There is a wide range of logging tools which are designed to measure various physical properties of the rocks and fluids contained within the rocks. The logging tools include transducers and sensors to measure properties such as electrical resistance, gamma-ray density, speed of sound and so forth. The individual logging tools are combinable and are typically connected together to form a logging tool-string. Some sensors are designed to make close contact with the borehole wall during data acquisition whilst others are ideally centered in the wellbore for optimal results. These requirements need to be accommodated with any device that is attached to the tool-string. A wireline logging tool-string is typically in the order of 20 ft to 100 ft long and 2" to 5" in diameter.

In cased hole, logging tools are used to assess the strength of the cement bond between the casing and the wellbore wall and the condition of the casing. There are several types of sensors and they typically need to be centered in the casing. One such logging tool utilises high frequency ultrasonic acoustic transducers and sensors to record circumferential measurements around the casing. The ultrasonic transmitter and sensor is mounted on a rotating head connected to the bottom of the tool. This rotating head spins and enables the sensor to record azimuthal ultrasonic reflections from the casing wall, cement sheath, and wellbore wall as the tool is slowly winched out of the wellbore. Other tools have transmitters and sensors that record the decrease in amplitude, or attenuation, of an acoustic signal as it travels along the casing wall. It is important that these transducers and sensors are well centered in the casing to ensure that the data recorded is valid. Other logging tools that measure fluid and gas production in flowing wellbores may also require sensor centralisation.

Logging tools are also run in producing wells to determine flow characteristics of produced fluids. Many of these sensors also require centralisation for the data to be valid.

In open hole (uncased wellbores), logging tools are used to scan the wellbore wall to determine the formation structural dip, the size and orientation of fractures, the size and distribution of pore spaces in the rock and information about depositional environment. One such tool has multiple sensors on pads that contact the circumference of the wellbore to measure micro-resistivity. Other tools generate acoustic signals which travel along the wellbore wall and are recorded by multiple receivers spaced along the tool and around the azimuth of the tool. As with the cased hole logging tools, the measurement from these sensors is optimised with good centralisation in the wellbore.

The drilling of wells and the wireline logging operation is an expensive undertaking. This is primarily due to the capital costs of the drilling equipment and the specialised nature of the wireline logging systems. It is important for these activities to be undertaken and completed as promptly as possible to minimise these costs. Delays in deploying a wireline logging tool are to be avoided wherever possible.

One cause of such delays is the difficulties in lowering wireline logging tools down to the target depth of the wellbore. The logging tool is lowered by a cable down the wellbore under the force of gravity alone. The cable, being flexible, can not push the tool down the wellbore. Hence the operator at the top of the well has very little control of the descent of the logging tool.

The chances of a wireline logging tools failing to descend is significantly increased with deviated wells. Deviated wells do not run vertically downwards and instead extend downward and laterally at an angle from vertical. Multiple deviated wells are usually drilled from a single surface location to allow a large area to be explored and produced. As wireline logging tools are run down a wellbore with a cable under the action of gravity, the tool-string will drag along the low side or bottom of the wellbore wall as it travels downwards to the target depth. The friction or drag of the tool-string against the wellbore wall can prevent to tool descending to the desired depth. The long length of a tool string can further exacerbate problems with navigating the tool string down wellbore.

With reference to FIG. 1, in deviated wells the weight of the tool-string exerts a lateral force (PW) perpendicular to the wellbore wall. This lateral force results in a drag force which acts to prevent the tool-string descending the wellbore. The axial component of tool-string weight (AW) acts to pull the tool-string down the wellbore and this force is opposed by the drag force which acts in the opposing direction. As the well deviation increases the axial component of tool weight (AW) reduces and the lateral force (PW) increases. When the drag resulting from the lateral force (PW) equals the axial component (AW) of tool-string weight the tool will not descend in the wellbore.

As hole deviation increases, the sliding friction or drag force can prevent the logging tool descending. The practical limit is 60° from the vertical, and in these high angle wells any device that can reduce friction is very valuable. The drag force is the product of the lateral component of tool weight acting perpendicular to the wellbore wall and the coefficient of friction. It is desirable to reduce the coefficient of friction in order to reduce the drag force. The coefficient of friction may be reduced by utilising low friction materials, such as Teflon. The drag force may also be reduced by using wheels.

A common apparatus to centralise logging tools is a bow-spring centraliser. Bow-spring centralisers incorporate a number of curved leaf springs. The leaf springs are attached at their extremities to an attachment structure that is fixed to the logging tool. The midpoint of the curved leaf spring (or bow) is arranged to project radially outward from the attachment structure and tool string. When the bow-spring centraliser is not constrained by the wellbore, the outer diameter of the bow-spring centraliser is greater than the diameter of the wellbore or casing in which it is to be deployed. Once deployed in the wellbore, the bow-springs are flattened and the flattened bow springs provide a centering force on the tool string. In deviated wells this centering force must be greater than the lateral weight component of the tool string acting perpendicular to the wellbore or casing wall. Consequently, more centering force is required at greater well deviations. If the centering force is too small the centraliser will collapse and the tool sensors are not centered. If the centralising force is too great the excessive force will induce unwanted drag which may prevent the tool descending or cause stick-slip motion of the logging tool. Stick-slip is where the tool moves up the wellbore in a series of spurts rather than at a constant velocity. Stick-slip action will compromise or possibly invalidate the acquired measurement data. The practical limit for gravity decent with using bow spring centralisers is in the order of 60 degrees from the vertical. Wellbores are vertical at shallow depths and build deviation with depth. Consequently, the centralisation force that is necessary varies within the same wellbore. As the bow spring centraliser must be configured for the highest deviations, invariably there is more drag than what is necessary over much of the surveyed interval. With bow spring centralisers, the centralising force is greater in small wellbores, as the leaf springs have greater deflection (more compressed), than in large wellbores. Consequently, stronger or multiple bowsprings are required in larger hole sizes. These centralisers usually have "booster" kits to impart more centering force in larger wellbores or those with higher deviations.

At deviations greater than 60 degrees other methods must be used to overcome the frictional forces and enable the tool string to descend in the wellbore. One method is to use a drive device (tractor) connected to the tool string. Tractors incorporate powered wheels that forcibly contact the wellbore wall in order to drive the tool string downhole. Another method is to push the tool string down hole with drill pipe or coiled tubing. These methods involve additional risk, more equipment and involve more time and therefore cost substantially more.

In order to reduce the centraliser drag, wheels may be attached to the centre of the bow spring to contact the wellbore wall. However, the fundamental problems associated with the collapse of the leafspring or over-powering persist.

Another known type of centraliser consists of a set of levers or arms with a wheel at or near where the levers are pivotally connected together. There are multiple sets of lever-wheel assemblies disposed at equal azimuths around the central axis of the device. There are typically between three and six sets. The ends of each lever set are connected to blocks which are free to slide axially on a central mandrel of the centraliser device. Springs are used force these blocks to slide toward each other forcing the arms to defect at an angle to the centraliser (and tool string) axis so that the wheels can extend radially outward to exert force against the wellbore wall. With this type of device, the centering force depends on the type and arrangement of the energising apparatus or springs. The centraliser device is typically energised by means of either axial or radial spring or a combination of both. The advantage of this type of centraliser is that drag is reduced by the wheels which roll, rather than slide along the wellbore wall.

A significant issue with lever-wheel centralisers is that these centralisers can fail in their ability to centralise a tool string in a well bore, due to a failure in the transfer of the radial movement of one arm to the other arms via the sliding blocks. The failure of these devices to centralise a tool string is exacerbated in smaller diameter well bores when the angle between the arms and the centreline of the centraliser is small. For example, at an arm angle of 10 degrees, a change in the wellbore diameter of 10 mm (5 mm radial displacement) results in an axial displacement of less than 1 mm.

With such a small axial movement of the sliding blocks, clearances between mechanical components such as in pivot points, bearings and the sliding members causes the centraliser device to fail to centralise the tool string since the radial displacement of one of the arm assemblies is not transferred sufficiently accurately to other arm assemblies through the sliding blocks. This results in the tool string running off centre which in turn can cause the tool string sensors to return erroneous data.

A centraliser device may also be energised by spring devices that directly exert a radially outward force. Such spring devices may be coil springs, torsion springs or leaf springs acting between the centraliser arm and a central mandrel. With leaf springs acting on the hinged arms or coil springs arranged radially from the centraliser/tool string axis the limitations described above still apply. Namely, the centralising force is greater in small wellbores, where the springs undergo greater deflection, than in large wellbores. At increased well deviations, more centering force is required. If the centering force is too small the centraliser will collapse and the tool sensors are not centered. If the centralising force is too great the excessive force will induce unwanted drag which may prevent the tool descending or cause stick-slip motion of the logging tool. At low arm angles the radial force may be increased by including radial booster springs, however this will not correct the fundamental problem of centralisation. The logging tool may run off centre by a distance determined by the tool weight acting perpendicular to the well bore wall and the spring stiffness of the radial springs.

The reference to any prior art in the specification is not, and should not be taken as, an acknowledgement or any form of suggestion that the prior art forms part of the common general knowledge in any country.

DISCLOSURE OF INVENTION

It is an object of the present invention to address any one or more of the above problems or to at least provide the industry with a useful device for centering sensor equipment in a bore or pipe.

According to one aspect of the present invention there is provided a device for centering a sensor assembly in a bore, the device comprising:
  a first support member and a second support member axially spaced apart along a longitudinal axis of the device;
  a plurality of arm assemblies connected between the first and second support members, each arm assembly comprising:
    a first arm pivotally connected to the first support member by a first pivot joint having a first pivot axis,
    a second arm pivotally connected to the second support member by a second pivot joint having a second pivot axis,
    a third arm connected between the first and second arms, the third arm pivotally connected to the first arm by a third pivot joint having a third pivot axis, and the third arm pivotally connected to the second arm by a fourth pivot joint having a fourth pivot axis, and
    a third support member positioned axially between the first and second support members, the third arm pivotally connected to the third support member by a fifth pivot joint having a fifth pivot axis coincident with and orthogonal to the longitudinal axis;
    wherein the third arm extends through a plane coincident with the longitudinal axis between the third pivot axis and the fourth pivot axis, so that in use each arm assembly contacts opposite sides of the bore to centralise the sensor assembly in the bore.

In some embodiments, the third pivot axis is located on a first side of the plane coincident with the longitudinal axis of the device, and the fourth pivot axis is located on an opposite second side of the plane.

In some embodiments, the first pivot axis and the third pivot axis are located on a first side of a plane coincident with the longitudinal axis of the device, the second pivot axis and fourth pivot axis are located on an opposite second side of the plane, and the third arm extends through the plane between the first pivot axis and the third pivot axis.

In some embodiments, the first pivot axis, second pivot axis and the third pivot axis are located on a first side of a plane coincident with the longitudinal axis of the device, the fourth pivot axis is located on an opposite second side of the plane, and the third arm extends through the plane between the first pivot axis and the third pivot axis.

In some embodiments, the second pivot axis and the third pivot axis are located on a first side of a plane coincident with the longitudinal axis of the device, the first pivot axis and the fourth pivot axis are located on an opposite second side of the plane, and the third arm extends through the plane between the first pivot axis and the third pivot axis.

In some embodiments, one or both of the first and second support members is adapted to move axially along the longitudinal axis to allow the arm assemblies to extend and retract radially with respect to the longitudinal axis.

In some embodiments, the third support member is adapted to move axially along the longitudinal axis.

In some embodiments, the first and second support members are adapted to move axially along the longitudinal axis to allow the arm assemblies to extend and retract radially with respect to the longitudinal axis, and wherein the third support member is fixed against axial movement. The third support member may be integrally formed with the mandrel.

In some embodiments, the fifth pivot joint and axis is located midway between the third and fourth pivot axes.

In some embodiments, a distance between the first and third pivot axes is greater than a distance between the third and fifth pivot axes, and a distance between the second and fourth pivot axes is greater than a distance between the fourth and fifth pivot axes.

In some embodiments, each arm assembly is rotationally symmetrical about the fifth pivot point.

In some embodiments, the third arm is symmetrical about the fifth pivot axis.

In some embodiments, each arm assembly comprises a first roller or wheel to contact the bore wall on the first side of a plane coincident with the longitudinal axis of the device and a second roller or wheel to contact the bore wall on an opposite second side of the plane.

In some embodiments, the fifth pivot joint and axis is located midway between the first and second wheels or rollers.

In some embodiments, the first and second rollers or wheels are rotationally coupled to the respective first arm and second arm or a respective end of the third arm on an axis of rotation perpendicular to the longitudinal axis and offset from the third and fourth pivot axes.

In some embodiments, the first and and/or the second arm is shaped or contoured to protect the wheels and/or reduce the chance of the centraliser being caught or hung up on wellbore restrictions.

In some embodiments, the first arm and/or the second arm is shaped or contoured so that an initial contact between the first and/or second wheel and a wellbore restriction occurs radially outside of the rotational axis of the wheel with respect to the longitudinal axis of the device when the arm assemblies are at a maximum radial outward position.

In some embodiments, the first arm and/or the second arm is shaped or contoured so that the first and/or second wheel contacts a wellbore restriction at an initial contact angle of at least 20 degrees, or at least 45 degrees.

In some embodiments, the first arm is shaped or contoured so that a radially outermost extent of the first arm located between the first wheel and the first pivot axis is radially outside the rotational axis of the first wheel with respect to the longitudinal axis of the device when the arm assemblies are at a maximum radial outward position, and/or
  wherein the second arm is shaped or contoured so that a radially outermost extent of the second arm located between the second wheel and the second pivot axis is radially outside the rotational axis of the second wheel with respect to the longitudinal axis of the device when the arm assemblies are at a maximum radial outward position.

In some embodiments, the first arm is shaped or contoured so that a radially outermost extent of the first arm located between the first wheel and the first pivot axis is positioned so that the first wheel contacts a wellbore restriction at an initial contact angle of at least 20 degrees, or at least 45 degrees when the arm assemblies are at a maximum radial outward position, and/or wherein the second arm is shaped or contoured so that a radially outermost extent of the second arm located between the second wheel and the second pivot axis is positioned so that the second wheel contacts a wellbore restriction at an initial contact angle of at least 20 degrees, or at least 45 degrees when the arm assemblies are at a maximum radial outward position.

In some embodiments, the wheels have an outer diameter of at least 30 mm, or at least 40 mm.

In some embodiments, the device comprises one or more spring elements to bias the arm assemblies radially outwards so that each arm assembly contacts the bore wall on the first side of the plane and the opposite second side of the plane.

In some embodiments, the device comprises one or more spring (axial) elements acting on the first support member and/or the second support member to bias the first and second support members axially together and the arm assemblies radially outwards.

In some embodiments, the device comprises one or more (radial) spring elements acting on one or more of the arm assemblies to bias the arm assemblies radially outwards.

In some embodiments, the one or more spring elements are configured together with an angle (A) between a line extending through the third and fourth pivot axes and the longitudinal axis being in a range so that the arm assemblies each provide a substantially constant radial force for a range of well bore diameters.

In some embodiments, an angle (A) between a line extending through the third and fourth pivot axes and the longitudinal axis is maintained in a range substantially greater than 10 degrees and substantially less than 75 degrees.

In some embodiments, an angle (A) between a line extending through the third and fourth pivot axes and the longitudinal axis is maintained in a range 25 degrees to 65 degrees.

In some embodiments, the first and second pivot joints are circumferentially spaced apart around the longitudinal axis of the device (azimuthally misaligned).

In some embodiments, the first and second pivot joints are circumferentially spaced apart (azimuthally misaligned) by 180 degrees around the longitudinal axis of the device.

In some embodiments, the plane is a first plane, and the first, second, third and fourth pivot joints are aligned on a second plane coincident with the longitudinal axis of the centraliser and orthogonal to the first plane.

In some embodiments, each arm assembly comprises a first roller or wheel to contact the wellbore wall on the first side of the first plane and a second roller or wheel to contact the wellbore wall on the opposite second side of the first plane, and the rollers or wheels are aligned on the second plane.

In some embodiments, the fifth pivot joint is laterally offset from the second plane.

In some embodiments, the device comprising a mandrel, the first support member and the second support members adapted to move axially along the mandrel, and wherein the first pivot axis and the second pivot axis are located radially outside an outside diameter of the mandrel.

In some embodiments, the first and second pivot axes do not intersect the mandrel.

In some embodiments, the arm assemblies are circumferentially nested or intertwined together around the mandrel.

In some embodiments, the arm assemblies are arranged so that the first pivot joints and first pivot axes of the arm assemblies are aligned on a first plane orthogonal to the longitudinal axis, and the second pivot joints and second pivot axes of the arm assemblies are aligned on a second plane orthogonal to the longitudinal axis.

In some embodiments, the arm assemblies are arranged so that the third pivot joints and third pivot axes are aligned on a third plane orthogonal to the longitudinal axis.

In some embodiments, the arm assemblies are arranged so that the fourth pivot joints and fourth pivot axes are aligned on a fourth plane orthogonal to the longitudinal axis.

In some embodiments, the arm assemblies are arranged so that the fifth pivot joints and fifth pivot axes are aligned on a fifth plane orthogonal to the longitudinal axis.

In some embodiments, the centraliser is a passive device, with energisation of the arm assemblies radially outwards being provided by one or more spring elements of the device only.

Radial extremities of the arm assemblies together present an outer diameter of the device. In some embodiments, the device comprises an adjustable mechanical stop mechanism to set a maximum outer diameter of the device within a range of maximum outer diameters so that the device is configurable for use in a pre-determined range of bore diameters, and the one or more spring elements are pre-loaded to bias the arm assemblies radially outwards so that the device supports the sensor assembly when the radial extremities are at the set maximum diameter.

In some embodiments, the mandrel comprises a plurality of facets spaced apart around an outer surface of the mandrel and the first and/or second support member each has a corresponding plurality of facets spaced apart around an inner surface of the support member, to rotationally key the first and/or second support member to the mandrel.

In some embodiments, the plurality of facets is arranged so that the mandrel has a polygon shaped outer surface and the first and/or second support member has a corresponding polygon shaped inner surface.

In some embodiments, the third support member is rotationally unkeyed to the mandrel.

In some embodiments, the mandrel has a first portion corresponding with the first support member, a second portion corresponding with the second support member, and a third portion corresponding with the third support member, and the first and/or second portions of the mandrel comprising a said plurality of facets, and the third portion of the mandrel is without a plurality of facets or is cylindrical.

Preferably the polygon is a regular polygon, for example the mandrel may have a hexagon or octagon shaped outer surface. In some embodiments, the outer surface of the mandrel has a facet azimuthally aligned with each of an adjacent first and/or second pivot joint at the first and/or second support member. The number of facets may be equal to the number of arm assemblies. The mandrel may have a facet extending between adjacent first pivot joints and/or adjacent second pivot joints, such that the number of facets is equal to the number of arm assemblies or twice the number of arm assemblies. For example, the centraliser comprises three arm assemblies and the mandrel comprises six facets, or a hexagonal shaped outer surface corresponding with the first and/or second support member, with the first and/or second support member having a corresponding hexagonal shaped inner surface.

In some embodiments, the device is adapted for centering a wireline logging tool string in a wellbore during a wireline logging operation.

According to a second aspect of the present invention there is provided a device for centering a sensor assembly in a bore, the device comprising:
 a first support member and a second support member axially spaced apart along a longitudinal axis of the device;
 a plurality of arm assemblies connected between the first and second support members, each arm assembly comprising:
  a first arm pivotally connected to the first support member by a first pivot joint having a first pivot axis,
  a second arm pivotally connected to the second support member by a second pivot joint having a second pivot axis,
  a third arm connected between the first and second arms, the third arm pivotally connected to the first arm by a third pivot joint having a third pivot axis, and the third arm pivotally connected to the second arm by a fourth pivot joint having a fourth pivot axis, wherein the third pivot axis is located on a first side of a plane coincident with the longitudinal axis of the device, and the fourth pivot axis is located on an opposite second side of the plane, and
  a third support member positioned axially between the first and second support members, the third arm pivotally connected to the third support member by a fifth pivot joint having a fifth pivot axis coincident with the plane,
  the third arm extending through the plane between the third pivot axis and the fourth pivot axis, so that in use each arm assembly contacts opposite sides of the bore to centralise the sensor assembly in the bore.

The second aspect may comprise any one or more of the features described above in relation to the first aspect.

According to a third aspect of the present invention there is provided a device for centering a sensor assembly in a bore, the device comprising:
 a first support member and a second support member axially spaced apart along a longitudinal axis of the device;
 a plurality of arm assemblies connected between the first and second support members, each arm assembly comprising:
  a first arm pivotally connected to the first support member by a first pivot joint having a first pivot axis;
  a second arm pivotally connected to the second support member by a second pivot joint having a second pivot axis; and
  a roller or wheel to contact the wellbore wall;
  wherein the first and second arms are connected so that relative axial movement of the first and second support members causes the arm assemblies to extend and retract radially with respect to the longitudinal axis; and
  wherein first arm and/or the second arm is shaped or contoured so that a radially outermost extent of the arm is located between the wheel and the respective first or second pivot axis, and wherein the radially outermost extent is positioned so that the wheel contacts a wellbore restriction at an initial contact angle of at least 20 degrees, or at least 45 degrees.

The third aspect may comprise any one or more of the features described above in relation to the first aspect.

According to a fourth aspect of the present invention there is provided a wireline logging tool string comprising one or more elongate sensor assemblies and a device according to the first, second or third aspects of the invention described above, the device for centering the wireline logging tool string in a wellbore during a wireline logging operation.

Unless the context suggests otherwise, the term "wellbore" may to refer to both cased and uncased wellbores. Thus, the term 'wellbore wall' may refer to the wall of a wellbore or the wall of a casing within a wellbore.

Unless the context suggests otherwise, the term "tool string" refers to an elongate sensor package or assembly also known in the industry as a "logging tool", and may include components other than sensors such as guide and orientation devices and carriage devices attached to sensor components or assemblies of the tool string. A tool string may include a single elongate sensor assembly, or two or more sensor assemblies connected together.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to". Where in the foregoing description, reference has been made to specific components or integers of the invention having known equivalents, then such equivalents are herein incorporated as if individually set forth.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

BRIEF DESCRIPTION OF THE DRAWINGS

An example embodiment of the invention is now discussed with reference to the Figures.

FIG. 2A is a side view of the centraliser with arm assemblies of the centraliser in a radially outward position corresponding with a larger wellbore diameter. FIG. 2B shows the arm assemblies in a radially inward position corresponding with a smaller wellbore diameter. FIGS. 2C and 2D are end views, with the arm assemblies in the radially outward and inward positions. FIGS. 2E and 2F are isometric type views again showing the arm assemblies in the radially outward and radially inward positions. FIG. 2G is a cross sectional view on a centreline (longitudinal axis) of the centraliser on line F-F in FIG. 2C, with the arm assemblies in a radial position in between the radial positions shown in FIGS. 2A and 2B.

FIGS. 3A to 3G Illustrate the centraliser of FIGS. 2A to 2G but with only one arm assembly shown to highlight the arrangement of each arm assembly in the embodiment of FIGS. 2A to 2G. FIG. 3A is a side view. FIG. 3B is another side view orthogonal to the view of FIG. 3A. FIG. 3C is a cross sectional view on a centreline (longitudinal axis) of the centraliser on line G-G in FIG. 3A. FIG. 3D is an isometric view. FIGS. 3E to 3I are cross sectional views on lines H-H, I-I, J-J, K-K, L-L respectively, indicated in FIG. 3B.

FIG. 5A is a side view and FIG. 5B is an isometric view.

FIG. 6A is a side view, FIG. 6B is an isometric view, and FIG. 6C is an end view.

FIG. 9A is a side view. FIG. 9B is an enlarged view on a first arm of the centraliser. FIG. 9C shows the centraliser in a wellbore and a first arm of the centraliser engaging a reduction in wellbore diameter. FIG. 9D shows the centraliser in a wellbore with a wheel of the centraliser making an initial contact with the reduction in wellbore diameter. FIG. 9E is an enlarged view on the first arm in contact with the reduction in wellbore diameter. FIG. 9F is an enlarged view on the wheel making initial contact with the reduction in wellbore diameter.

FIG. 13A is an isometric view and FIG. 13B is a cross sectional view through a support member and the mandrel on a sectional line lateral to a longitudinal axis of the centraliser.

BEST MODES FOR CARRYING OUT THE INVENTION

Figure 1:
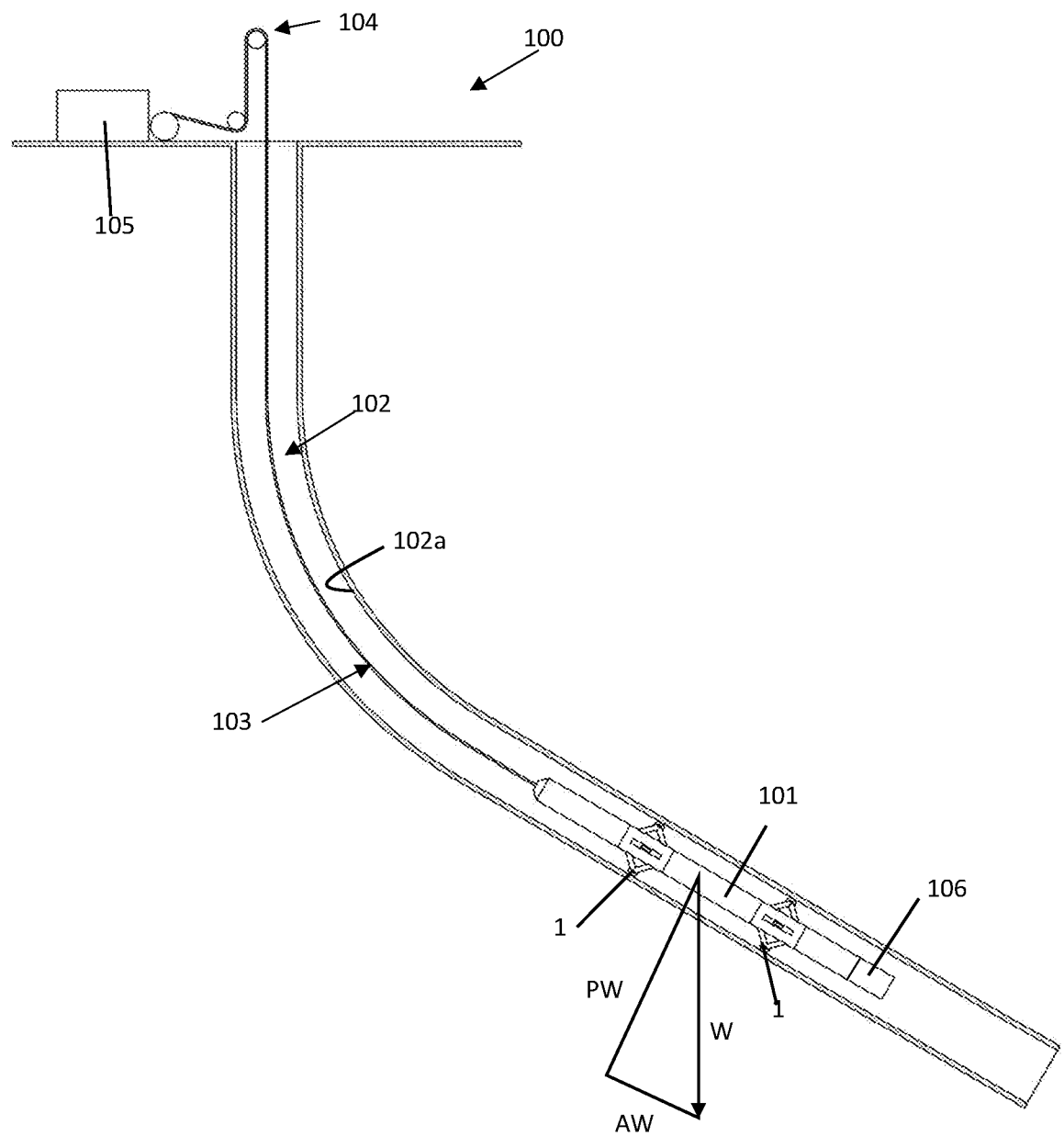
FIG. 1 is a schematic representation of a well site and a tool string descending a wellbore in a wireline logging operation.

FIG. 1 provides a schematic representation of a well site 100. A logging tool string 101 is lowered down the wellbore 102 on a wireline 103. Wellsite surface equipment includes sheave wheels 104 typically suspended from a derrick and a winch unit 105 for uncoiling and coiling the wireline to and from the wellbore, to deploy and retrieve the logging tool 101 to and from the wellbore to perform a wellbore wireline logging operation. The logging tool string 101 may include one or more logging tools each carrying one or more sensors 106 coupled together to form the logging tool string 101. The wireline 102 includes a number of wires or cables to provide electrical power to the one or more sensors 106 and transmit sensor data to the wellsite surface. One or more centralising devices 1 are provided to the logging tool 101 to centralise the logging tool 101 in the wellbore 102.

FIGS. 2A to 2G present schematic illustrations of a centralising device 1 to be provided with or as part of the tool string 101. The centralising device (or centraliser) comprises a coupling 2 or interface at each end to connect the centraliser 1 to other components of the tool string 101. The couplings may include electrical or hydraulic connections to provide electrical and hydraulic communication from the wireline to the wireline logging tool and/or between wireline tools. Alternatively, the centraliser device may be integral with the wireline logging tool, e.g. the outer housing of the logging tool may form a central mandrel of the centraliser. Alternatively, the centraliser device may slip over the outside of the wireline logging tool (housing) thereby avoiding any electrical or hydraulic connections with the tool string and wireline. The couplings or interfaces may be any suitable coupling or interface known in the art.

Figure 6A:
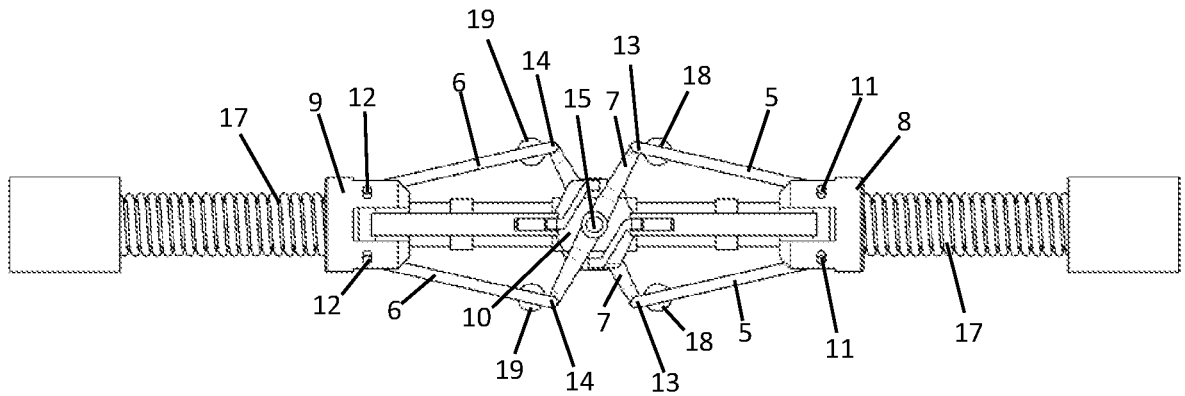
FIGS. 6A to 6C show a centraliser similar to the centraliser of FIGS. 2A to 2G but with four arm assemblies.
Figure 6B:
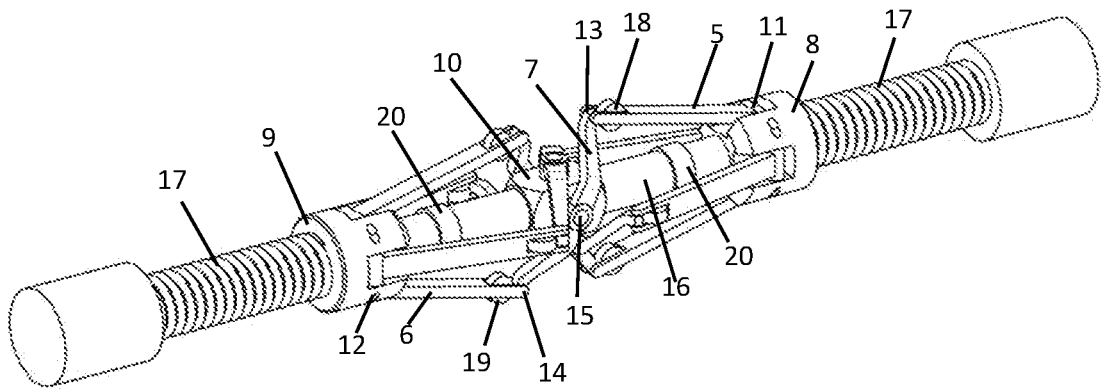
Figure 6C:
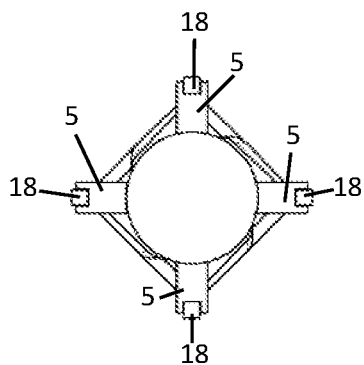

A plurality of arm assemblies (linkages) 3 are spaced circumferentially apart around a longitudinal axis 4 of the device 1. In the illustrated embodiment there are three arm assemblies 3, however the centraliser may have three, four or more arm assemblies, for example five or six arm assemblies. FIGS. 6A to 6C illustrate an example centraliser with four arm assemblies 3.

The arm assemblies 3 are configured to move axially and radially to engage the wellbore wall 102a to provide a centering force to maintain the tool string 101 in the centre of the wellbore 102. Each arm assembly or linkage 3 comprises a first arm or link 5 and a second arm or link 6. The first arm 5 is pivotally connected to a first support member 8 by a first pivot joint 11, and the second arm 6 is pivotally connected to a second support member 9 by a second pivot joint 12. Each arm assembly 3 further comprises a third arm or link 7 connected between the first and second arms 5, 6. The third arm 7 is pivotally connected to the first arm 5 by a third pivot joint 13 and the second arm 6 by a fourth pivot joint 14. A third support member 10 is positioned axially between the first and second support members 8, 9. The third arm 7 is pivotally connected to the third support member 10 by a fifth pivot joint 15.

Each pivot joint 11, 12, 13, 14, 15 has a pivot pin or axle on which the arms 5, 6, 7 pivot about a pivot axis 11a, 12a, 13a, 14a, 15a, being an axis of the pin or axle and therefore joint. One or both of the first and second support members 8, 9 are adapted to move axially, so that each arm assembly 3 is moved radially to engage the wellbore wall 102 by pivoting of the first, second and third arms 5, 6, 7 about the respective first, second, third, fourth and fifth pivot joints 11, 12, 13, 14, 15.

The centraliser 1 has one or more spring elements 17 to provide a force to the arm assemblies 3 to force the arm assemblies 3 against the wellbore wall 102a to provide a centralising force to maintain the centraliser 1 and therefore the associated tool-string 101 centrally within the wellbore 102. In the illustrated embodiment, both of the first and second support members 8, 9 move axially, and the centraliser 1 has an axial spring 17 acting on each of the first and second support members 8, 9 to bias the support members 8, 9 axially together to thereby bias the arm assemblies 3 radially outwards against the wellbore wall 102a. Where one of the support members 8, 9 is fixed, the centraliser 1 is without a spring acting on the fixed support.

Preferably the third support member 10 also moves axially, and most preferably the first, second and third support members 7, 8, 9 move axially so that the support members and connected arm assemblies 3 can axially move (or float) along the longitudinal axis 4. In an alternative, less preferred embodiment, the first and second support members are adapted to move axially along the longitudinal axis and the third support member is fixed against axial movement. For example, the third support member may be integrally formed with the mandrel.

With the first, second and third support members 8, 9, 10 and therefore arm assemblies 3 configured to move axially on the mandrel 16, when the centraliser hits a ledge or other obstruction in the wellbore as the tool string traverses down the wellbore, the centraliser arm assemblies 3 may move axially, reducing mechanical stress on the centraliser components. In an equilibrium state the centraliser support members 8, 9, 10 and arm assemblies 3 return to a 'central' position between the springs 17 where the springs are of the same length and spring force.

The support members 8, 9, 10 may slide axially on a central member or mandrel 16 of the centraliser 1. For example, each support member 8, 9, 10 may comprise a collar or annular member colinear with and received on the mandrel 12 to slide thereon. Each support member 7, 8, 9 may comprise a number of parts assembled together about the mandrel 12.

Figure 4A:
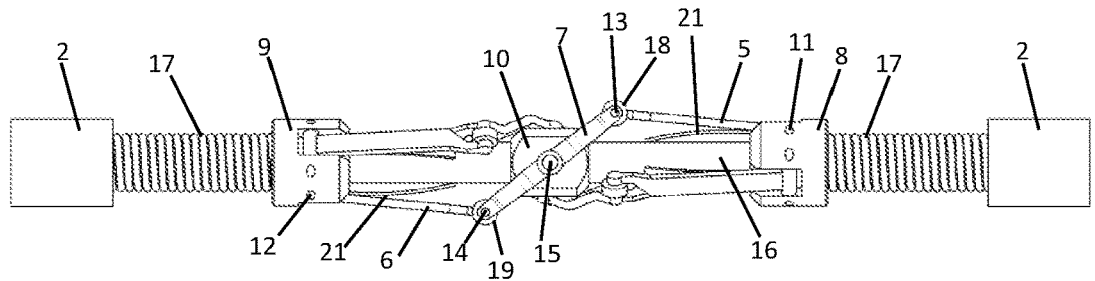
FIGS. 4A and 4B show two centralisers incorporating radially acting springs.
Figure 4B:
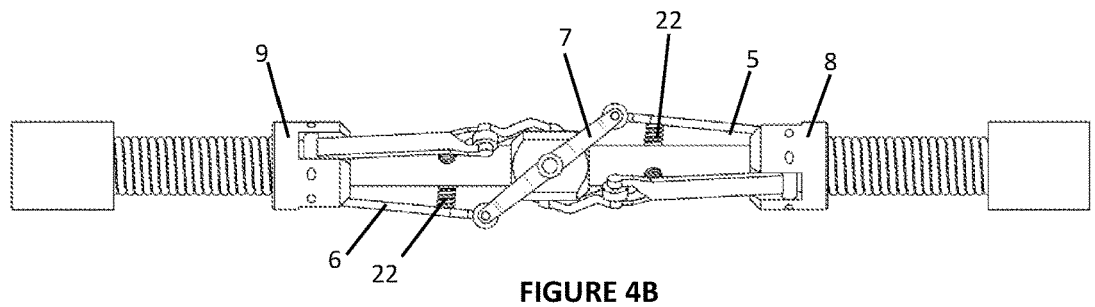
Figure 10:
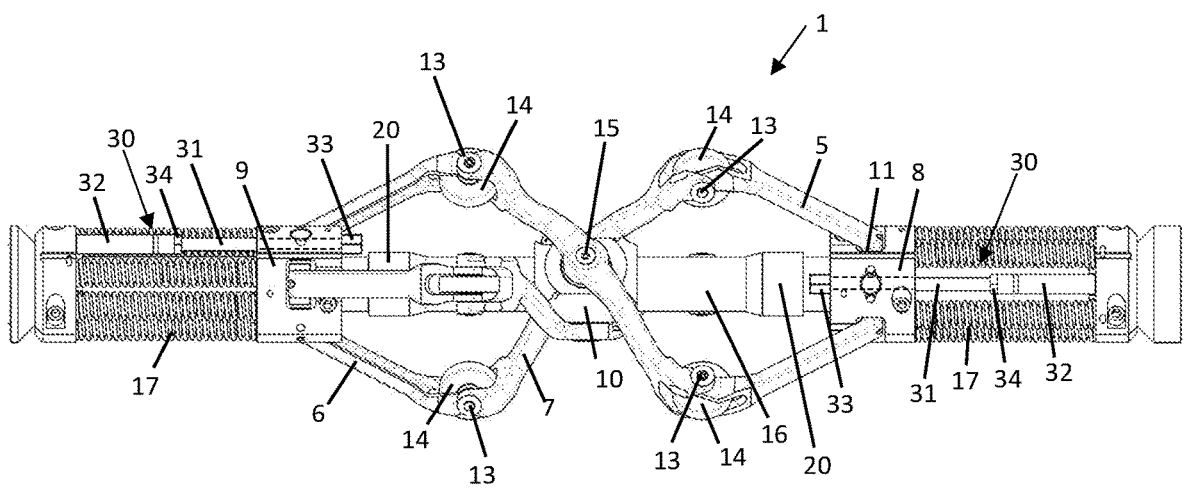
FIG. 10 shows a centraliser similar to the centraliser of FIGS. 2A to 2G but additionally includes an adjustable mechanical stop component to pre-set a maximum outer diameter for the centraliser.

The axial spring(s) 17 may be coil springs that are colinear with the mandrel 16 as shown in the illustrated embodiment or may include a plurality of coil springs arranged circumferentially (azimuthally spaced apart) around the mandrel (as shown in the embodiment of FIG. 10). Those skilled in the art will understand that other types of springs and spring configurations may be used to power the centraliser such as torsion springs, leaf springs and Belleville washers for example. A combination of two or more spring devices may also be used, for example one or more springs may be provided end-to-end to impart a combined non-linear spring rate. Alternatively, the pitch of the coil spring may vary over its length to provide a non-linear spring rate. The centraliser may additionally or alternatively have spring elements that exert a radially outwards force directly to the arm assemblies. For example, a coil or leaf spring may be located between the first arm and the mandrel or first support member, and/or between the second arm and the mandrel or second support member, and/or between the third arm and the mandrel or third support member, to provide a radially acting force. By example, FIG. 4A illustrates a centraliser with a radially acting leaf spring 21 between the mandrel and the first and second arms 5, 6, and FIG. 4B illustrates a centraliser with a radially acting coil spring 22 between the mandrel and the first and second arms 5, 6. A centraliser according to the present invention may have only axial springs, only radial springs, or a combination of both axial and radial springs. A combination of both axial and radially acting springs may be used to provide a relatively constant radial force.

Figure 2A:
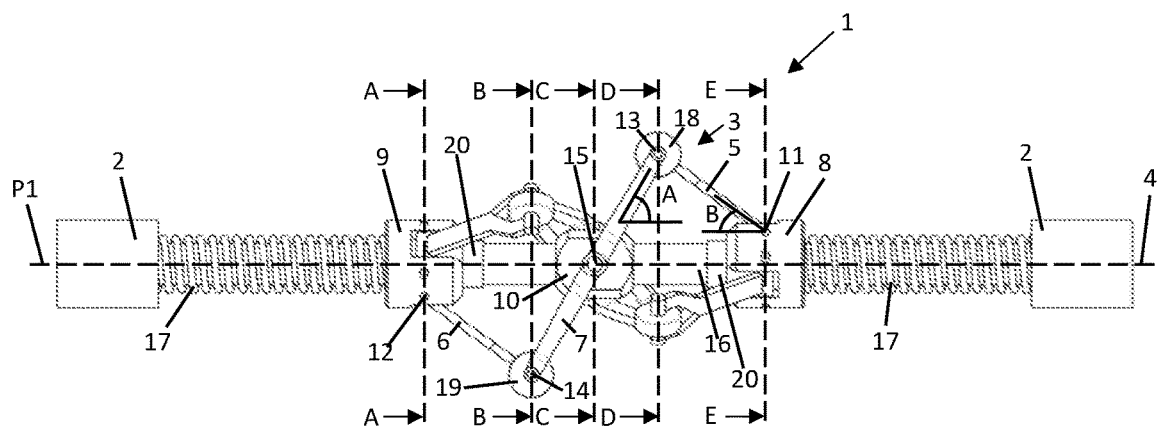
FIGS. 2A to 2G provide schematic representations of a centralising device (a centraliser) according to one embodiment of the present invention.
Figure 5A:
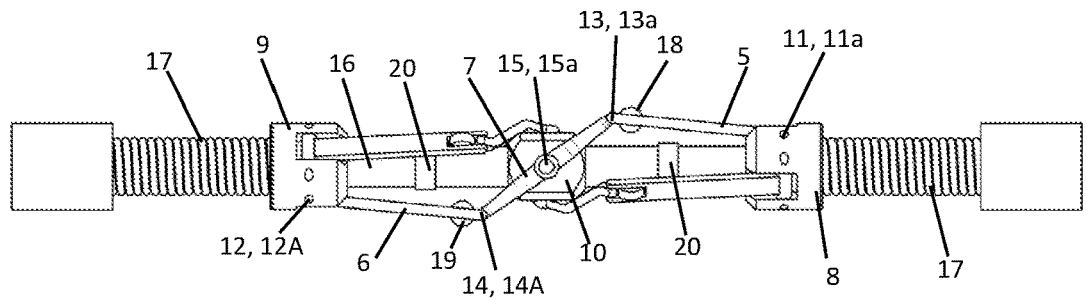
FIGS. 5A and 5B show a centraliser similar to the centraliser of FIGS. 2A to 2G but with a rotational axis of a first and second wheel of each arm assembly offset from third and fourth pivot joints of each arm assembly.
Figure 5B:
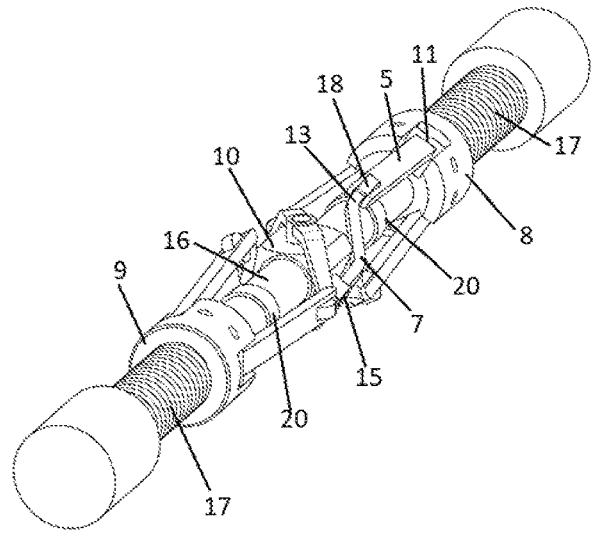

Preferably each arm assembly 3 comprises a first roller or wheel 18 located at or adjacent the third pivot joint 13 to contact the wellbore wall 102a, and a second roller or wheel 19 located at or adjacent the fourth pivot joint 14. In use the arm assemblies 3 are biased radially outwards so that the first and second wheels 18, 19 make contact with opposite sides of the wellbore, to reduce friction between the wellbore wall 102a and the tool string 101 as the tool string 101 traverses the well bore 102. The first roller 18 may have a rotational axis colinear with a pivot axis 13a of the third pivot joint 13, and the second roller 19 may have a rotational axis colinear with a pivot axis of the fourth pivot joint 14, as shown in FIG. 2A. Alternatively, the rotational axis of the first roller 18 may be located adjacent the third pivot joint 13, and the rotational axis of the second roller 19 may be located adjacent the fourth pivot joint 14. For example, the first roller 18 may be rotationally mounted to the first arm 5 or the third arm 7 adjacent the third pivot joint 13, and/or the second roller 19 may be rotationally mounted to the second arm 6 or the third arm 7 adjacent the fourth pivot joint 14. The first roller 18 may have a rotational axis parallel with a pivot axis 13a of the third pivot joint 13, and the second roller 19 may have a rotational axis parallel with a pivot axis of the fourth pivot joint 14, as shown in FIG. 2A. FIGS. 5A and 5B illustrate an embodiment with a similar configuration to the centraliser of FIGS. 2A to 2G, but with the first roller 18 mounted to the first arm 5 adjacent to the third pivot axis 13a, with a rotational axis of the roller 18 parallel to the third pivot axis 13a, and with the second roller 19 mounted to the second arm 6 adjacent to the fourth pivot axis 14a, with a rotational axis of the roller 19 parallel to the third pivot axis 14a.

Mechanical stops 20 may be provided on the mandrel to set a maximum diameter for the centraliser 1. Each stop 20 limits axial movement of the respective support member 8, 9, to limit the radial outward movement of the arm assemblies 3. Where the centraliser 1 enters a large diameter section in the wellbore, the mechanical stops 20 prevent the arm assemblies 3 extending radially outside a desired range, to avoid for example difficulties with the centraliser 1 passing from the larger diameter to a smaller diameter section of the wellbore or passing through the wellhead control assembly. The wellhead control assembly consists of a stack of rams and valves used to close the wellbore for safety reasons. The wellhead control assembly has sections of larger internal diameters that can catch on the arm assemblies and prevent the centraliser passing through.

As shown in the Figures, the third arm 7 extends across the longitudinal axis 4 of the centraliser between the third and fourth pivot axes. The third pivot axis is located on a first side of a plane P1 coincident with the longitudinal axis 4 of the centraliser, and the fourth pivot axis is located on an opposite second side of the plane P1. The third arm 7 extends through the plane P1 and between the third pivot axis 13a and the fourth pivot axis 14a. The fifth pivot axis 15a is coincident with the longitudinal axis 4, i.e. the pivot axis 15a is orthogonal to and intersects the longitudinal axis 4. The fifth pivot axis 15a is coincident with the plane P1. The third and fourth pivot axes are equidistant from the fifth pivot axis, or in other words the fifth pivot joint 15 and axis 15a is located midway between the third and fourth pivot axes 13a, 14a.

The third arm 7 or "rocker arm" is symmetrical about the pivot axis 15a. The rocker arm pivots about the pivot axis 15a passing though the longitudinal axis 4, i.e. the wheels 18, 19 are located equidistant from the pivot axis 15a, or in other words the fifth pivot joint 15 and axis 15a is located midway between the wheels. The rocker arm 7, energised by the springs acting through the arm assemblies 3, ensures the arm assemblies/wheels 18, 19 are in contact with the wellbore wall on opposite sides of the wellbore. Hence the "rocker arm" with central pivot axis 15a passing through the longitudinal axis 4 ensures the longitudinal axis of the centraliser and the tool string is located in the centre of the wellbore, centralising the tool string for accurate data collection.

The arrangement of the rocker arm 7 in each arm assembly 3 provides for a direct centralisation of the centraliser and associated tool string in the wellbore. For example, in a deviated well, one of the first or second wheels 18, 19 of at least one arm assembly will contact a bottom side of the wellbore (a side of the wellbore below a centreline of the wellbore), with the centraliser 'resting' under its own weight and the weight of the tool string on the low side of the wellbore. The spring(s) 17 bias the first and second support members 8, 9 together to bias the arm assemblies radially outwards so that the other one of the first and second wheels 18, 19 contact the opposite high side of the wellbore. With the first and second wheels contacting opposite sides of the wellbore, the centraliser and tool string must be central in the wellbore. Regardless of wellbore deviation (from vertical to highly deviated to horizontal), the spring(s) bias the arm assemblies radially outwards so that by reason of the rocker arm symmetry, the arm assemblies (preferably the wheels of the arm assemblies) contact opposite sides of the wellbore to directly center the centraliser and tool string in the wellbore.

Figure 7:
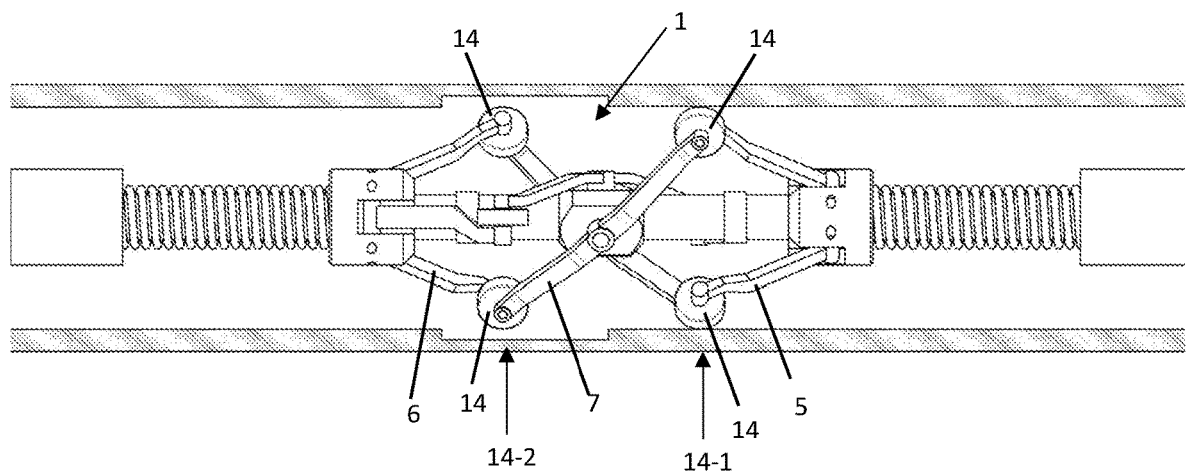
FIG. 7 illustrates the centraliser of FIGS. 2A to 2G passing through a casing joint presenting an enlarged wellbore section.

Furthermore, the centraliser can 'bridge across' large diameter wellbore sections while continuing to centralise a sensor. For example, FIG. 7 illustrates the centraliser 1 passing through a casing joint presenting an enlarged wellbore section. The centraliser presents two axially spaced apart sets of radial extremities presented by the wheels at or adjacent each end of the third arms 7 of the arm assemblies. One set of wheels 14-1 remains in contact with the wellbore wall outside of the enlarged diameter section to continue to centralise the sensor assembly as the other set of wheels 14-2 passes through the enlarged diameter section. This arrangement achieves a smooth passage as the centraliser traverses through an enlarged diameter section of a wellbore.

In the illustrated embodiment, the first pivot axis 11a and the third pivot axis 13a are located on a first side of the plane P1 coincident with the longitudinal axis of the device, and the second pivot axis 12a and fourth pivot axis 14a are located on the opposite second side of the plane P1. In an alternative embodiment, the first and second arms 5, 6 may extend across the longitudinal axis 4 of the centraliser, with the first pivot axis 11a and the fourth pivot axis 14a located on a first side of the plane P1 coincident with the longitudinal axis of the device, and the second pivot axis 12a and the third pivot axis 13a located on an opposite second side of the plane P1. In a further alternative embodiment, one of the first and second arms 5, 6 may extend across the longitudinal axis. For example, the first pivot axis 11a, second pivot axis 12a and the third pivot axis 13a may be located on the first side of the plane P1 coincident with the longitudinal axis of the device, with the fourth 14a pivot axis located on the opposite second side of the plane P1, however this arrangement is less preferred. Preferably the first and third pivot axes are on one side of the plane P1 and the second and fourth axes are on the other opposite side of the plane, as illustrated.

Figure 2B:
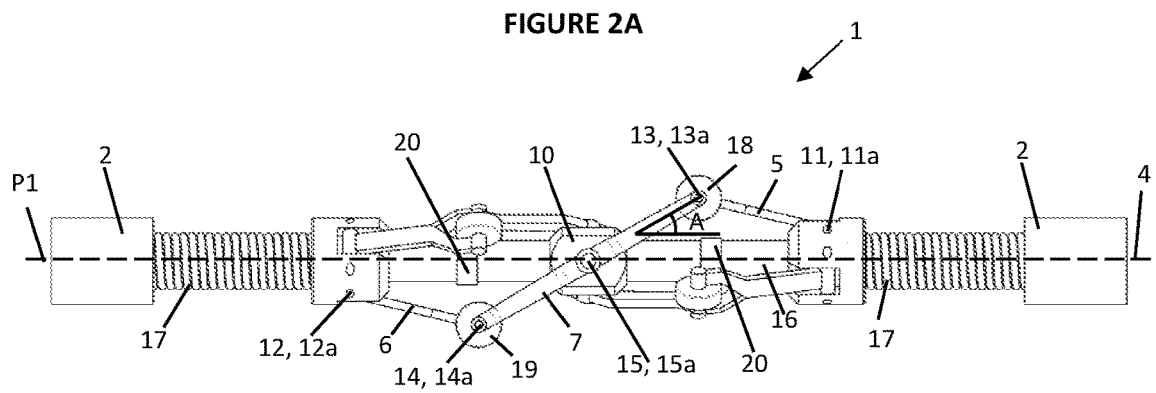
Figure 2C:
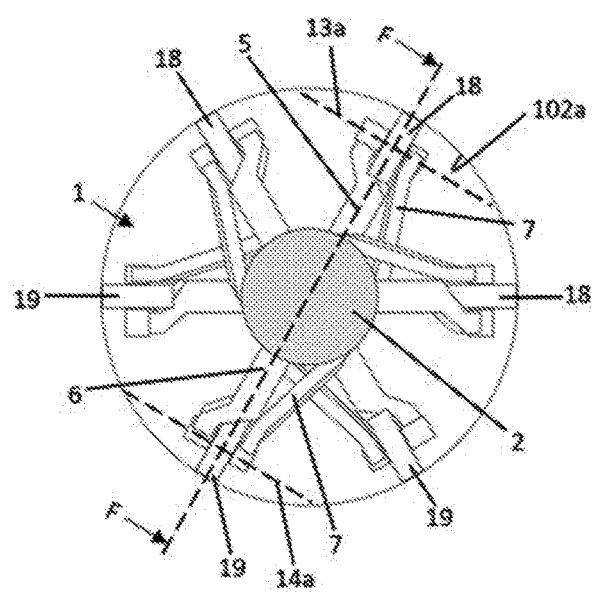
Figure 2D:
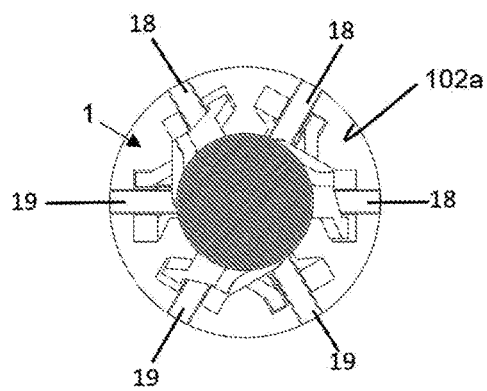
Figure 2E:
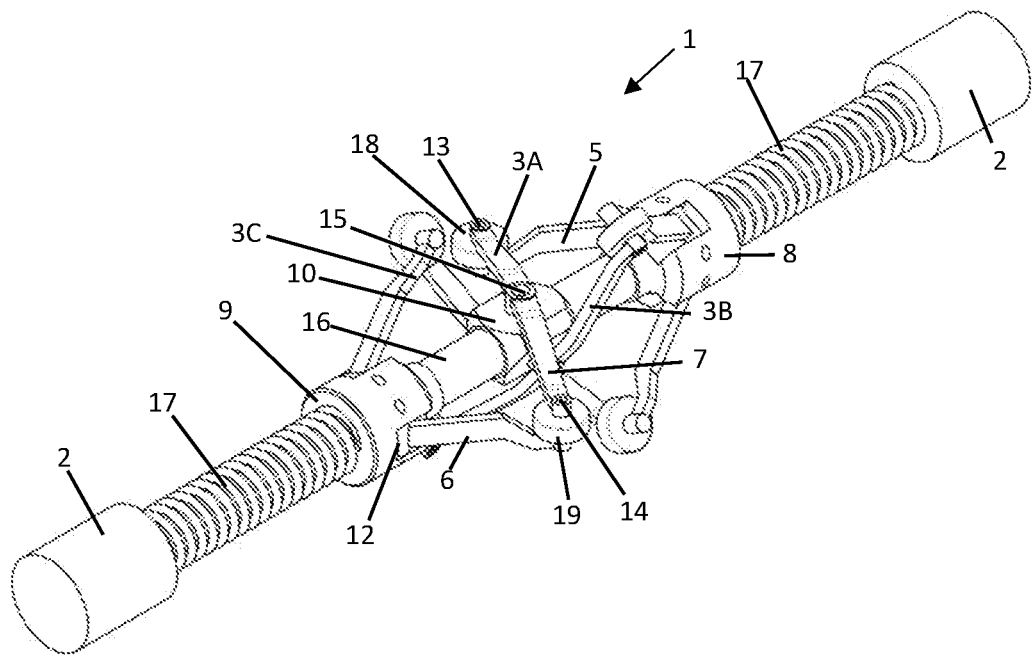
Figure 2F:
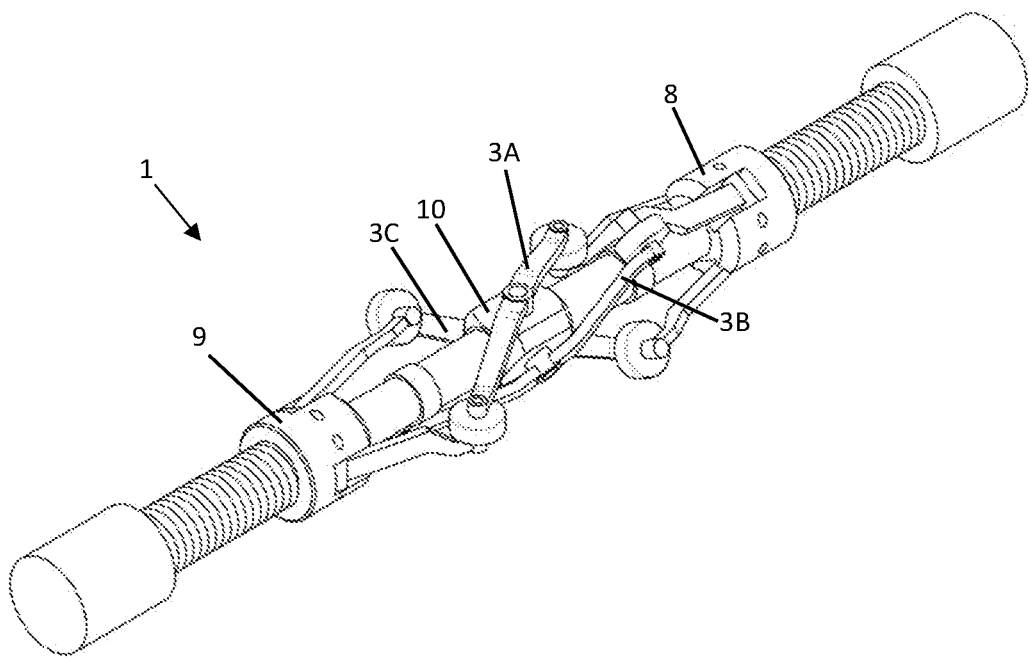
Figure 2G:
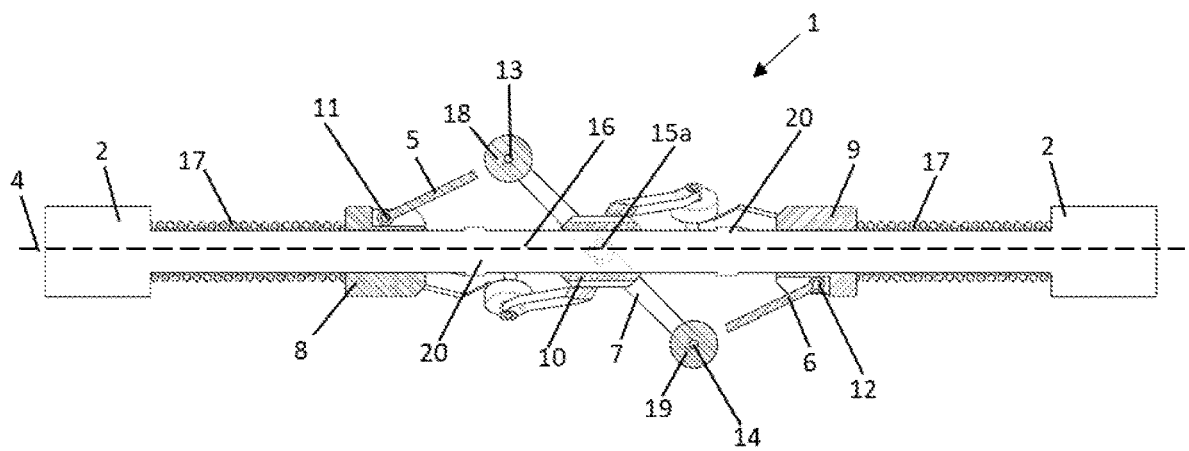
Figure 2H:
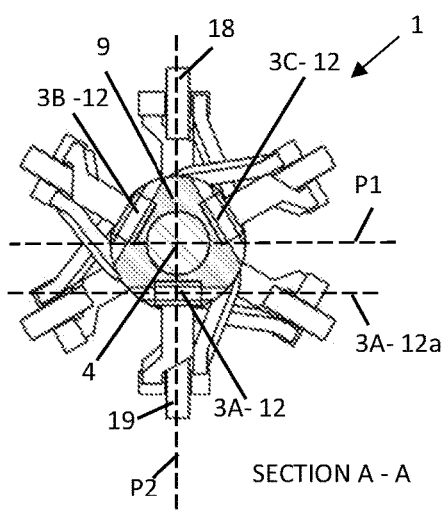
FIGS. 2H to 2L provide schematic cross sectional views on lines A-A, B-B, C-C, D-D and E-E respectively, indicated in FIG. 2A.
Figure 2I:
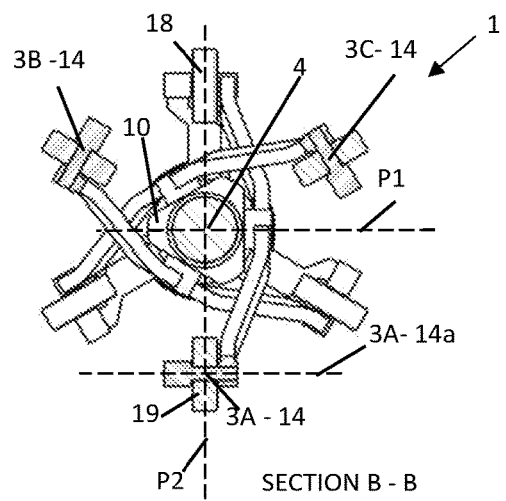
Figure 2J:
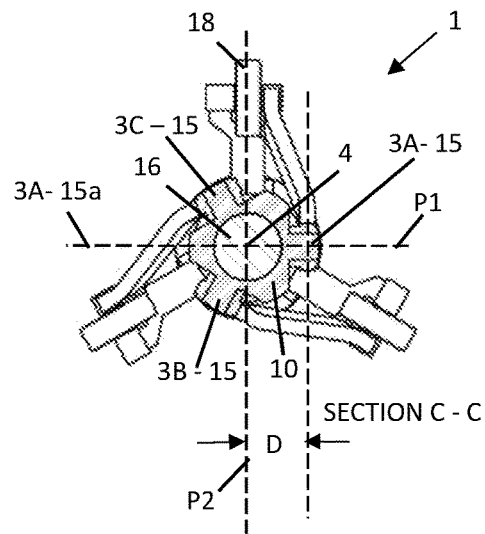
Figure 2K:
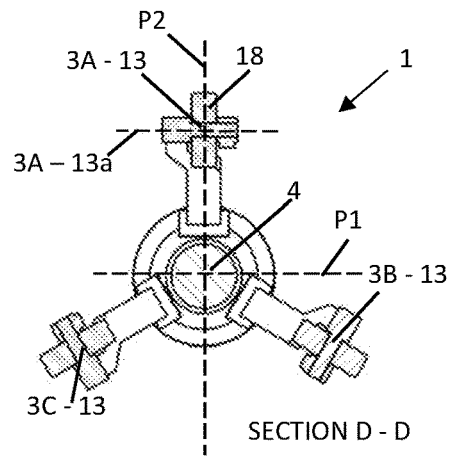
Figure 2L:
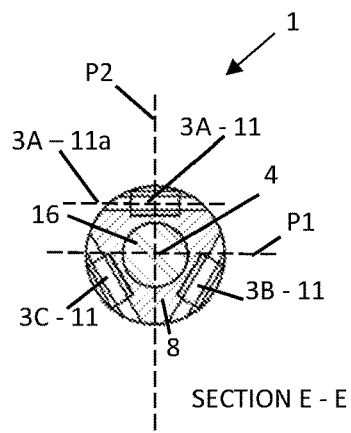
Figure 3A:
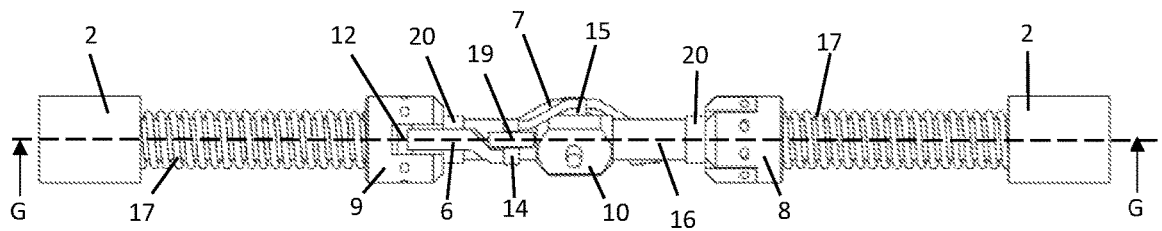
Figure 3B:
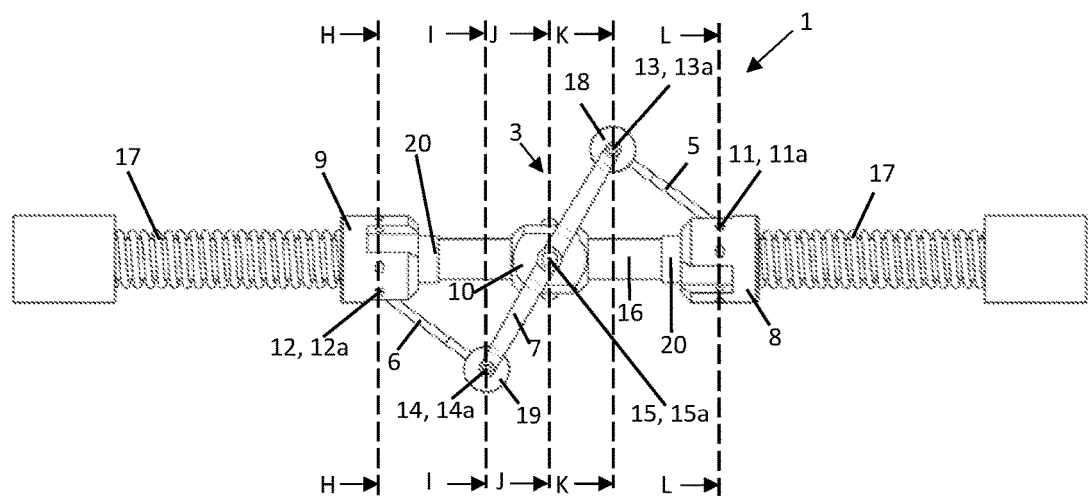
Figure 3C:
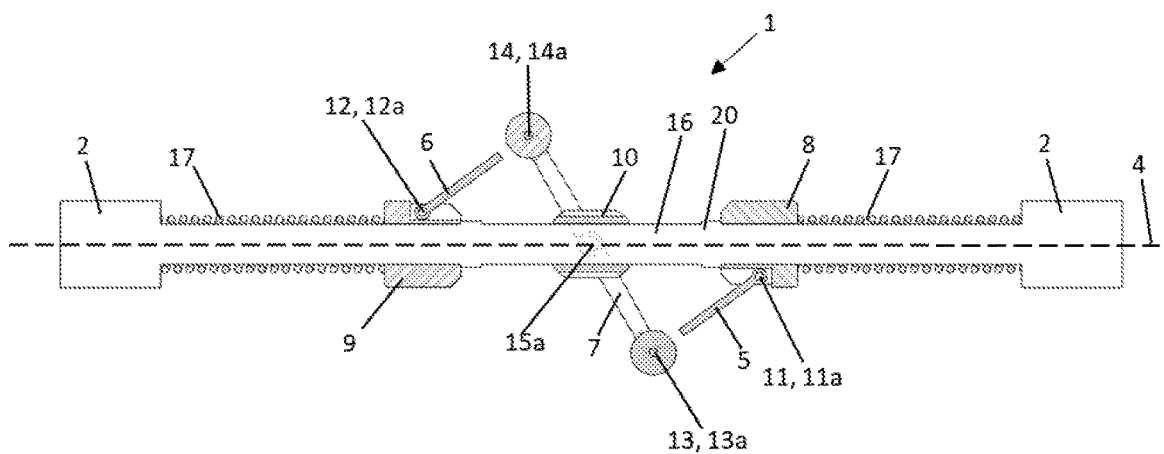
Figure 3D:
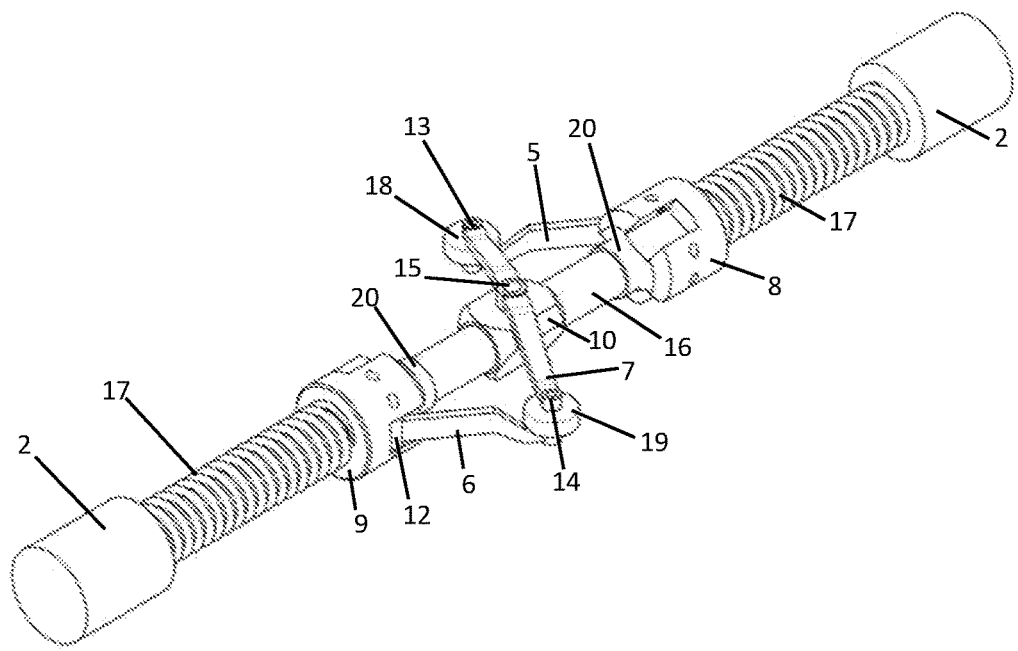
Figures 3E, 3F, 3G, 3H, 3I:
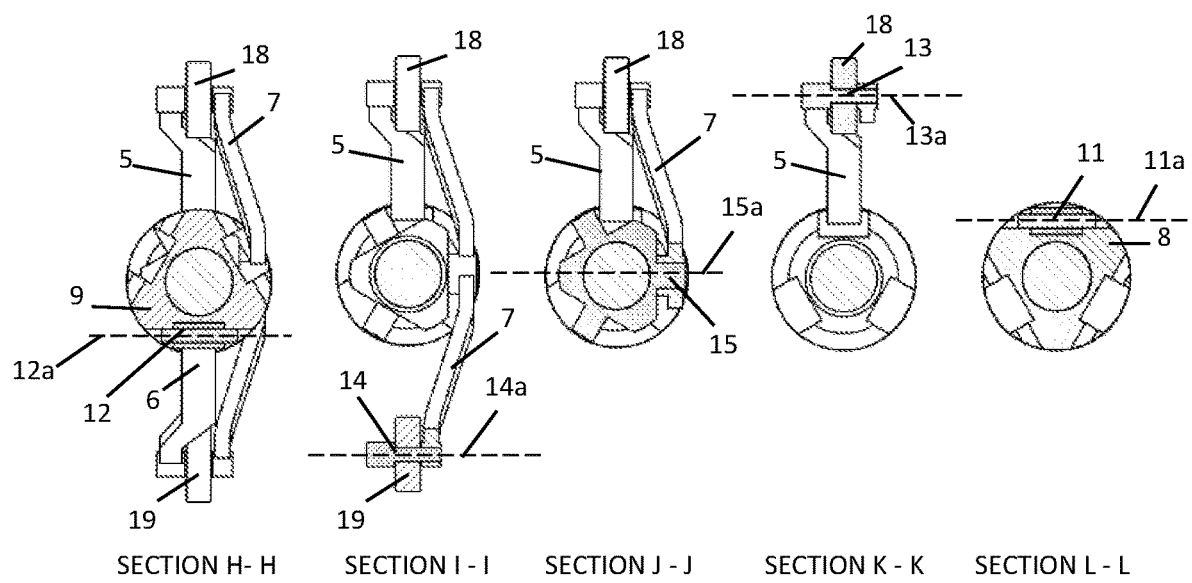

The relative positions of the pivot points of the illustrated embodiment are further highlighted by the cross-sectional views of FIGS. 2H to 2L. The arm assemblies 3 are referenced as arm assemblies 3A, 3B and 3C, as shown in FIGS. 2E and 2F. With reference to an arm assembly 3A, the first, second, third, fourth and fifth pivot joints are referenced in FIGS. 2H to 2L as 3A-11, 3A-12, 3A-13, 3A-14 and 3A-15, with respective pivot axes referenced as 3A-11a, 3A-12a, 3A-13a, 3A-14a and 3A-15a. As shown, the first pivot joint 3A-11 and respective axis 3a-11a, and the third pivot joint 3A-13 and respective axis 3A-13a are located on a first side of a plane P1 coincident with the longitudinal axis 4. The second pivot joint 3A-12 and respective axis 3A-12a, and the fourth pivot joint 3A-14 and respective axis 3A-14a are located on a second opposite side of the plane P1 coincident with the longitudinal axis 4. The fifth pivot joint 3A-15 and its respective pivot axis 3A-15a is coincident with the plane P1 and longitudinal axis 4. The first, second, third, fourth and fifth pivot axes are parallel, and are orthogonal to the longitudinal axis of the centraliser 1. The first and second pivot joints 3A-11 and 3A-12 are circumferentially spaced apart around the longitudinal axis of the device (azimuthally misaligned). The first and second pivot joints are circumferentially spaced apart (azimuthally misaligned) by 180 degrees around the longitudinal axis of the device. Further, the first, second, third and fourth pivot joints are aligned on a second plane P2 coincident with the longitudinal axis of the centraliser. Plane P2 is orthogonal to plane P1. Preferably the first and second rollers 18, 19 are also laterally aligned with the first, second, third and fourth pivot joints on plane P2 as shown. The fifth pivot joint is laterally offset from the second plane P2, e.g. by an offset distance D as best shown in FIG. 2J. The third arm 7 extends around the mandrel 16 to either side of the plane P1 to position the third and fourth pivot joints 3A-13 and 3A-14 on the plane P2.

One or more of the support members 8, 9, 10 may be keyed to the mandrel 16 to rotationally fix the support member(s) to the mandrel so that the support members move axially on the mandrel without relative rotation between the support members and the mandrel. For example, one of the mandrel and the support member may comprise a longitudinal 'rail' or projection to engage a corresponding longitudinal channel or slot in the other one of the mandrel and support member. For example, in FIG. 8 the mandrel 16 includes a longitudinal 'rail' or projection 23 to engage a corresponding longitudinal channel or slot 24 in each respective support member 8, 9, 10. One skilled in the art will understand the male/female sense of the keying arrangement 23, 24 between the support member(s) 8, 9, 10 and mandrel 16 may be reversed, i.e. the support member 8, 9, 10 may comprise a longitudinal 'rail' or projection to engage a corresponding longitudinal channel or slot in the mandrel 16. The keying arrangement 23, 24 ensures the pivot joints 11, 12, 13 and 14 and wheels 18, 19 remain aligned on a plane coincident with the longitudinal axis of the centraliser (e.g. plane P2 in FIGS. 2H to 2L.

The lateral alignment of the pivot joints 11, 12, 13, 14 and wheels 18 and 19 on plane P2 reduces mechanical stress on the pivot joints, for example by reducing bending moments and thrust loads on the joints 11, 12, 13, 14 and 15.

As best shown in FIGS. 2A and 2B, the arm assemblies 3 are arranged so that the first pivot joints 11 and pivot axes 11a of the arm assemblies 3 are axially aligned. That is, the first pivot joints 11 and axes 11a of all arm assemblies 3 are aligned on a traverse plane (a plane orthogonal to the longitudinal axis 4, e.g. a first plane extending through line E-E in FIG. 2A). Similarly, the second pivot joints 12 and axes 12a are aligned in a traverse plane (e.g. a second plane extending through line A-A in FIG. 2A). Preferably the third pivot joints 13 and axes 13a are aligned in a traverse plane (e.g. a third plane extending through line D-D in FIG. 2A, the fourth pivot joints 14 and axes 14a are aligned in a traverse plane (e.g. a fourth plane extending through line B-B in FIG. 2A, and the fifth pivot joints 15 and axes 15a are aligned in a traverse plane (e.g. a fifth plane extending through line C-C in FIG. 2A).

With the first and second pivot joints and their respective axes axially aligned, the arm assemblies 3 are circumferentially nested together around the mandrel, or in other words the arm assemblies 3 are intertwined around the mandrel 16, much like the threads in a multi-start thread are intertwined. This arrangement achieves a reduced length centraliser, compared to if the arm assemblies 3 were spaced axially along the centraliser.

With reference to FIGS. 9A to 9F, in some embodiments, the arm assemblies may be shaped or contoured to protect the wheels 18, 19 of the arm assemblies and/or reduce the chance of the centraliser being caught or hung up on wellbore restrictions. In the illustrated embodiment, the first and second arms 5, 6 of each arm assembly 3 is shaped or contoured to make contact with a wellbore restriction. As the centraliser traverses past the wellbore restriction, contact between the first or second arms 5, 6 forces the arm assemblies radially inwards, so that when the wheels 18, 19 arrive at the reduced diameter section, contact with each wheel occurs radially outside of the rotational axis of the wheel. Contact with the reduction in wellbore diameter outside the radial axis of the wheels results in a force applied to the wheels that acts to force the arms further radially inwards to allow the centraliser to pass the wellbore restriction and into the reduced wellbore section. Contact with the wheels at a step down in wellbore diameter occurring radially inside of the rotational axis of the wheels can result in a force applied to the wheels that acts to force the arm assemblies radially outwards, resulting in the centraliser and tool string being caught or hung up on the wellbore restriction. The shaped or contoured arms therefore improve the chance of the centraliser and tool string traversing past changes in wellbore diameter.

Each arm 5, 6 is contoured or shaped so that the arm 5, 6 has a radially outermost extent located between the wheel 18, 19 and the respective first or second pivot axis. The radially outermost extent is radially outside of the rotational axis of the wheel 18, 19 with respect to the longitudinal axis of the centraliser, at least when the arm assemblies 3 are at a maximum radial outward position.

Figure 9A:
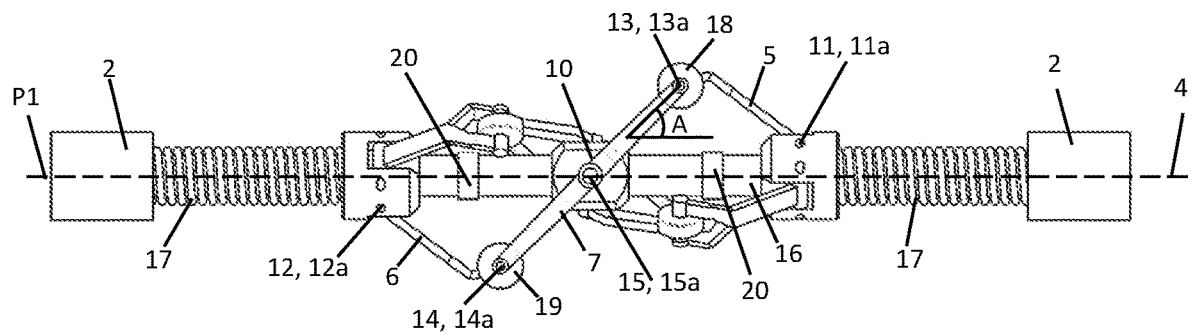
FIGS. 9A to 9F show a centraliser similar to the centraliser of FIGS. 2A to 2G but additionally with arms configured to protect wheels of the arm assemblies and/or reduce the risk of the centraliser catching on a wellbore restriction.
Figure 9B:
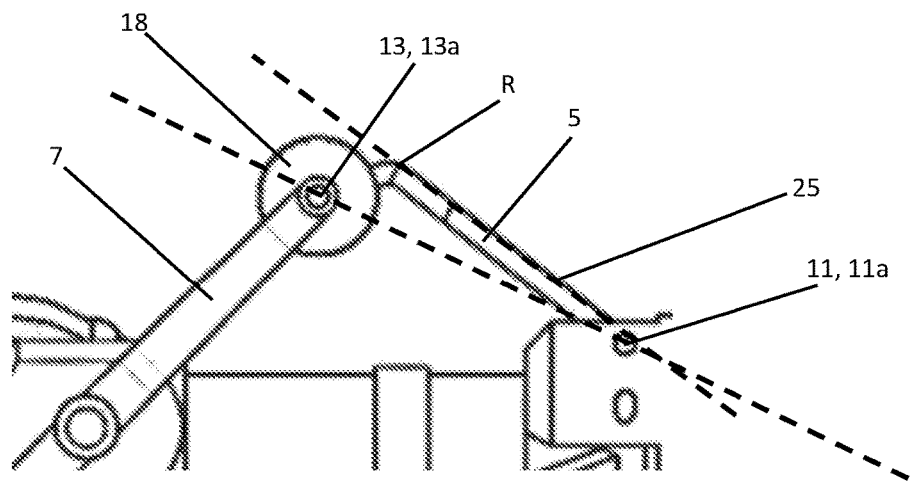
Figure 9C:
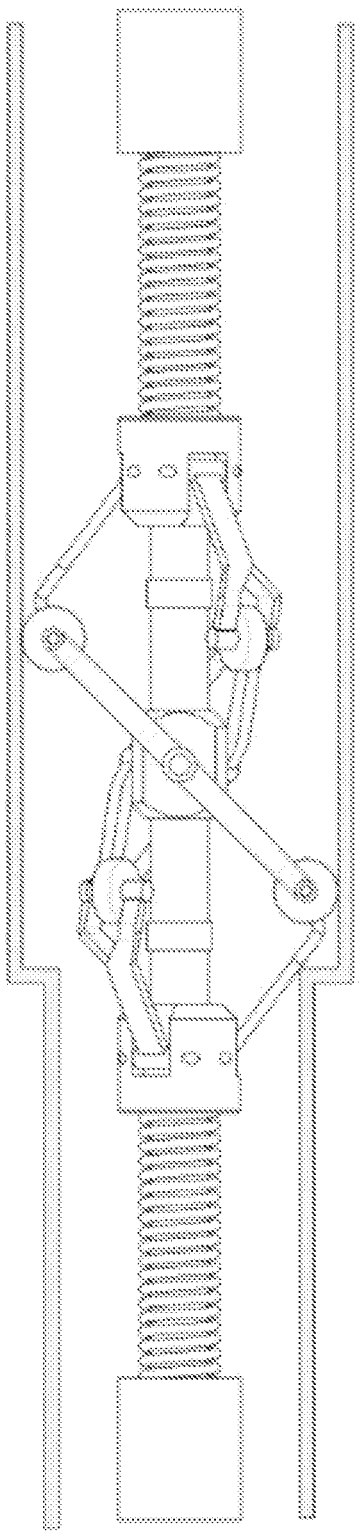
Figure 9D:
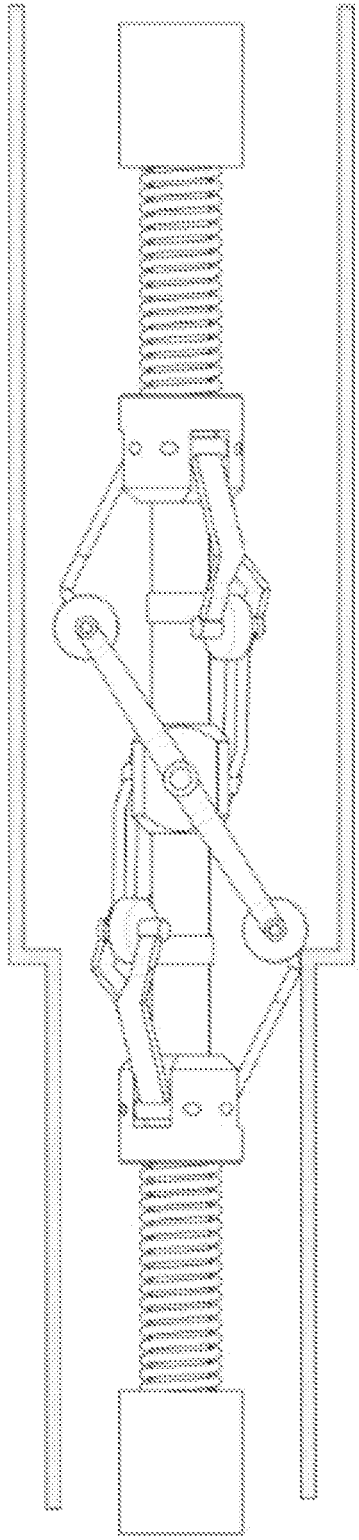
Figure 9E:
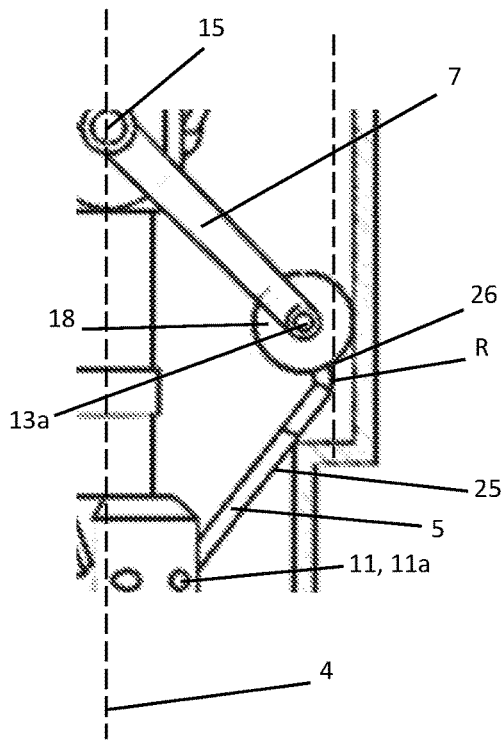
Figure 9F:
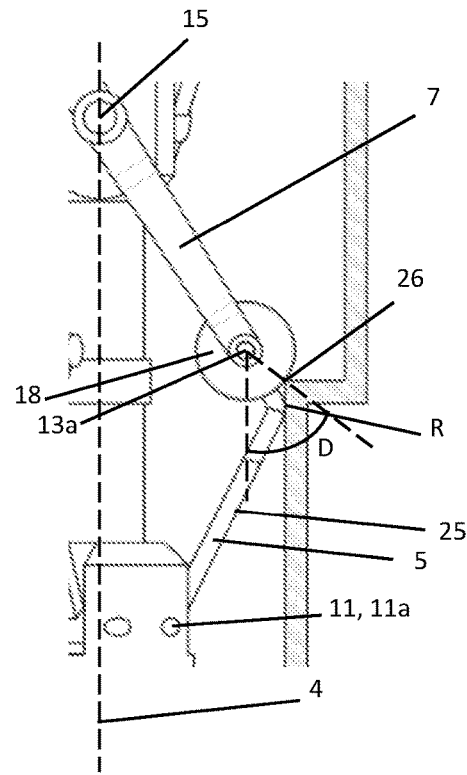

For example, with reference to FIG. 9F, in the illustrated embodiment, the first arm 5 is contoured or shaped so that a radial outermost extent R (radial with respect to the longitudinal axis 4 of the centraliser) of the arm 5 is located between the wheel 18 and the first pivot axis 11a. The radial outermost extent R is radially outside the rotational axis 13a of the wheel 18 with respect to the longitudinal axis of the centraliser, at least when the arm assemblies 3 are at a maximum radial outward position. As the radially outermost extent of the arm is between the wheel and the first pivot axis, the arm 5 contacts the wellbore restriction before the wheel 18, to ensure the wheel contacts the wellbore restriction radially outside of the wheel rotational axis. This ensures a force applied to the wheel by contact with the wellbore wall acts in a direct to force the arm assemblies radially inwards.

In a preferred embodiment the arm 5 may be shaped or configured so that the radial outer extent R of the arm 5 ensures the wheel 18 contacts the reduced diameter of the wellbore at an initial contact angle of at least 20 degrees. With reference to FIG. 9F, the contact angle being the angle D between a line extending through the wheel axis and a contact point 26 on the wheel perimeter and the longitudinal axis 4 of the centraliser. Preferably the wheel initial contact angle is at least 20 degrees, and more preferably at least 45 degrees.

Preferably a leading edge or surface (25 in FIG. 9F) of the arm 5, 6 presents a ramp surface inclined at an angle to the longitudinal axis. The ramp surface contacts the wellbore restriction to cause the arm assembly 3 to be forced radially inwards while guiding the centraliser past the wellbore restriction, as shown in FIGS. 9C and 9E, until the outermost radial extend of the arm R contacts the wellbore restriction. In some embodiments, a line extending along the ramp surface is a tangent to an outer diameter of the wheel, or the line extends outside the outside diameter of the wheel, as shown in FIG. 9B. The arm 5, 6 is shaped or contoured so that an angle between the leading edge or surface of the arm and the longitudinal axis is greater than an angle between a line extending through the first and third pivot axes and the longitudinal axis for the first arm 5 (refer FIG. 9B), or through the second and fourth pivot axes and the longitudinal axis for the second arm 6.

The arms described with reference to FIG. 9A to 9F provide for a larger diameter wheel to be utilised in the centraliser, whereby the larger diameter wheel is protected by the arms. Larger diameter wheels provide reduced friction against the wellbore wall, compared to smaller diameter wheels. The wheels of the centraliser are preferably at least 30 mm, or at least 40 mm in diameter. Prior art centralisers typically have 20-25 mm diameter wheels.

One skilled in the art will appreciate that only the first arm or the second arm may be contoured or shaped as described, in which case the centraliser will have a preferred orientation in the wellbore (a bottom or downward end with the contoured or shaped arm). One or both ends of the third arm 7 may also be shaped or contoured to protect the 'trailing wheel' of each arm assembly, that is the wheel 19 in each arm assembly 3 that contacts the opposite side of the wellbore after the first wheel 18 has entered the reduced section of the wellbore. One skilled in the art will also appreciate that the arms shaped or contoured to protect the wheels may be utilised in any lever arm centraliser, including centralisers comprising only two arms in each arm assembly or linkage.

With reference to FIG. 10, in some embodiments the centraliser 1 has a mechanical stop 31 to set a maximum outer diameter of the centraliser. The radial extremities of the centraliser provided by the wheels 14 together present the outer diameter of the centraliser. That is, the radial extremities lie on a substantially circular curve, wherein the diameter of the circular curve presents the outer diameter of the centraliser. The springs bias the wheels radially outwards to a radially outermost unloaded position at an unloaded outer diameter of the device. The mechanical stop sets the maximum outer diameter to be smaller than the unloaded outer diameter so that the one or more springs are preloaded to provide the radial force to the wheels when at the pre-set maximum outer diameter. The springs 17 are preloaded to provide a radial force to the wheels 14 with the wheels at the set maximum diameter so that the centraliser supports the sensor assembly at the pre-set maximum diameter as it traverses along a bore. Preferably in use the maximum outer diameter is set to be equal to, or slightly greater than, or slightly less than, the intended well bore diameter. Setting the maximum outer diameter of the centraliser to be slightly less than or slightly more than, or equal to, the wellbore diameter allows the centralizer to be more easily inserted into the well bore. It may be difficult to insert the centraliser 1 into the wellbore where the centraliser springs 17 provide sufficient force to support the weight of the tool string and the maximum diameter of the centraliser is substantially greater than diameter of the wellbore.

In some embodiments, the centraliser has an adjustable mechanical stop mechanism 30 to allow the maximum diameter of the centraliser to be pre-set within a range of outer diameters to correspond to an intended wellbore diameter. In the illustrated embodiment of FIG. 10, the adjustable stop mechanism 30 comprises a stop component 31 configured to be adjustable to a set position relative to the frame 16. In the set position, engagement between the stop component 31 and the corresponding support member 8, 9 prevents axial movement of the support member 8, 9 towards the wheels 14, thereby setting the maximum outer diameter for the centraliser. In the illustrated embodiment the stop component 31 is a bolt. A shank of the bolt extends through a hole in the support member 8, 9 and a thread of the bolt is engaged with a thread of a mating threaded member 32 fixed to the frame 16 of the centraliser. A head 33 of the bolt 31 bears on the support member 8, 9 to limit movement of the support member towards the wheels 14. Rotation of the bolt relative to the threaded member 32 adjusts the maximum outer diameter for the centraliser. A locking mechanism may be provided to lock the stop component 31 in the set position. In the illustrated embodiment the locking mechanism is a nut 34 received on the bolt 31 to be tightened against an end of the mating threaded member 32. The support members 8, 9 are free to move axially away from the wheels 14, sliding over the shank of the bolt and allowing the centraliser diameter to decrease against the force of the springs 17. Alternatively, a spacer may be attached to the central mandrel 16 between the support member 8,9 and the mechanical stop 20 to prevent movement of the support member 8,9 toward the wheels 14, thereby setting the maximum diameter of the wheels. Spacers with different lengths can be used to set different maximum centraliser diameters. Other adjustable stop mechanisms for pre-setting the maximum outer diameter of the centraliser are described in New Zealand patent application 768524, the entire contents of which are incorporated herein by reference.

In the illustrated embodiments, the first and second pivot joints 11 and 12 are positioned radially outside an outside diameter of the central mandrel 16 of the centraliser. The first and second pivot axes 11a, 12a do not intersect the mandrel 16. The third and fourth pivot joints 13, 14 are also radially outside the outside diameter of the mandrel for a full radial range of movement of the arm assembly, i.e. the third and fourth pivot joints are outside the outside diameter of the mandrel even when the arm assembly is in a radially inner most position. The third and fourth pivot joints do not intersect the mandrel 16, even in a radially inner most position. This is a preferred arrangement, other arrangements for positioning the pivot axis inside of the OD of the mandrel may be possible.

Each linkage or arm assembly 3 provides a mechanical advantage (mechanical leverage) between the axial displacement and the radial displacement to provide, in combination with the axial spring element 13, a radial force to the wellbore wall 102a. As the support members 8, 9, 10 are linked by multiple arm assembles 3, each arm assembly is displaced equally with support member axial displacement, thereby centralising the centraliser and tool-string in the wellbore.

The mechanical advantage changes with the axial and radial position of the arm assembly 3. The mechanical advantage of the arm assembly 3 may be expressed as Fr/Fa, where Fa is the axial force provided by the axial spring element(s) 17 on the arm assembly and Fr is the resulting radial force applied to the wellbore wall 102a. As the mechanical advantage increases, the radial force, transferred from the axial spring force, to the wellbore wall increases. The mechanical advantage is dependent on the angle between each arm and the centreline of the device (for example angle A between the third arm 7 and the longitudinal axis in FIGS. 2A and 2B) and increases as the angle A increases. Similarly the angle B and C between the first and second arms 5,6 and the centreline of the device contributes toward the mechanical advantage. Thus, the mechanical advantage of the arm assembly 3 increases with increasing well bore diameter. In balance with the mechanical advantage, the spring(s) 17 provide(s) a force that decreases with increasing wellbore diameter, since the support members 8, 9 slides axially to decompress the spring. Conversely, as the wellbore diameter decreases the mechanical advantage decreases and the axial spring force increases as the spring is further compressed by the sliding support member.

It is to be understood that the angle between an arm and the central axis is defined as an angle between a line extending through the pivot axes at respective ends of the arm and the longitudinal axis. For example, the angle A between the third arm 7 and the longitudinal axis 4 is the angle A between a line extending through the third and fourth pivot axes 13a, 14a and the longitudinal axis 4.

Figure 11:
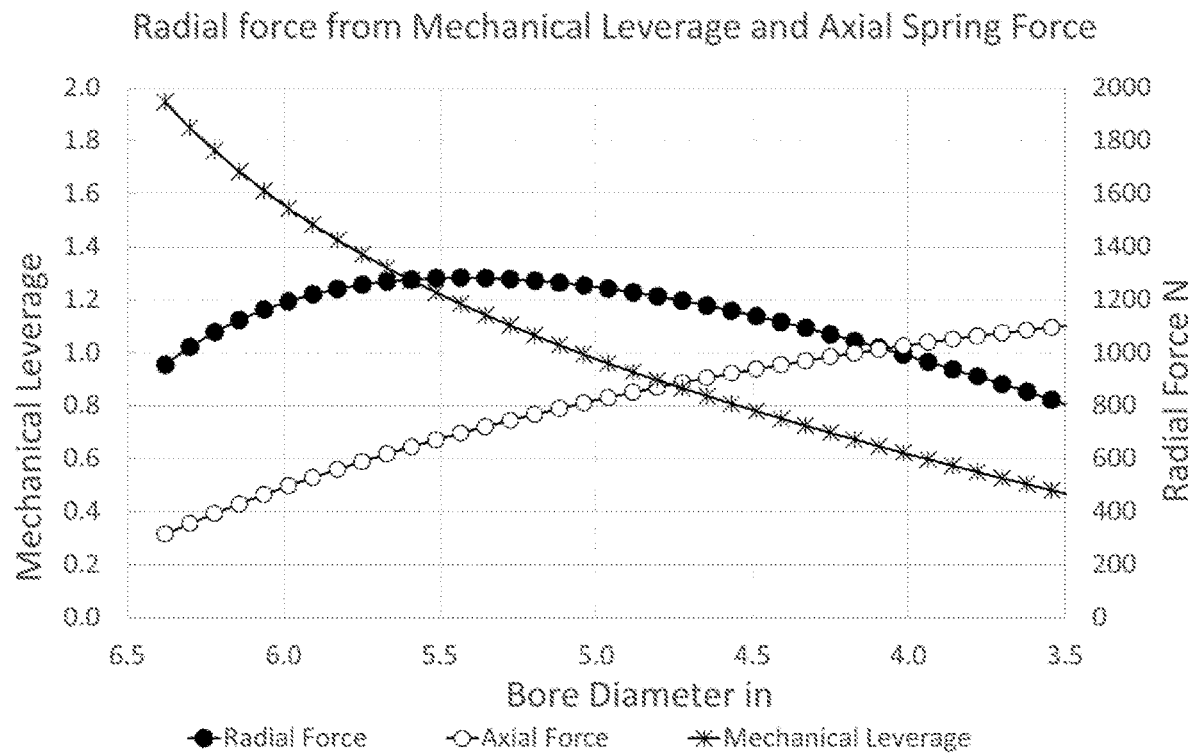
FIG. 11 provides a chart of mechanical advantage (leverage), axial spring force and a resulting radial force applied by an arm assembly of a centraliser according to the present invention to a well bore wall verses radial deflection of the arm assembly.

Preferably the centraliser 1 provides a relatively constant centering force over a range of wellbore diameters. The radial force applied by the centraliser 1 is a product of the axial spring force provided by spring(s) 17 and the mechanical advantage of the arm assembly 3. Since the axial force increases as the mechanical advantage decreases, a relatively constant radial force can be achieved for a range of well bore diameter sizes by optimising the spring rate, spring preload and arm assembly geometry, to balance the spring force and mechanical advantage. FIG. 11 illustrates a radial force for a centraliser comprising arm assemblies 3 as described herein designed to operate in a casing size that varies in diameter between 3.5 inches and 6.5 inches (a diameter range of 3 inches which equates to a radial range of 1.5 inches for each arm assembly from 1.75 inches to 3.25 inches). Within this diameter range the radial force is kept within a range of about 800 to 1300N (180 to 2921$bf$). In FIG. 11, the centering force is approximately 1050N±250N, which is considered relatively constant for the practical function of centralising a tool string 101 in a well bore 102.

To achieve a relatively constant radial force against the wellbore wall 102a, the angle A between the third arm 7 of the arm assembly 3 and the central axis 4 of the device 1 should preferably be maintained in a range to avoid very large angles and very small angles. At large angles between the longitudinal axis 4 and the third arm 7 of the arm assembly 3 (angles approaching 90 degrees), a small axial spring force will result in a high radial force applied to the wellbore wall 102a. High radial forces can result in greater friction as the logging tool string traverses the wellbore. High friction may prevent the tool string descending under gravity and may result in stick-slip where the tool moves up the wellbore in a series of spurts rather than a constant velocity, impacting the accuracy of the data collected. When the arms are at large angles, greater radial force is required to collapse the centraliser. This make it very difficult for the centraliser to descend into a smaller diameter casing (e.g. from 9⅝ in casing to 7 in liner). The centraliser arms may even become caught in the wellhead control assembly which consists of a stack of hydraulic rams and valves for well control and safety (closed in a blowout). Conversely, at small angles between the longitudinal axis and the third arm 7 of the arm assembly 3 (angles approaching 0 degrees), a large axial spring force is required to provide sufficient radial force to centralise the tool string.

Figure 12:
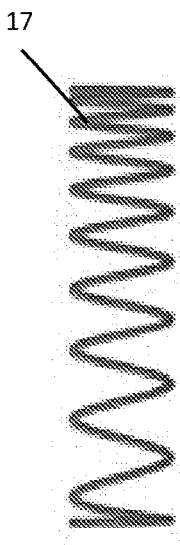
FIG. 12 shows a variable pitch coil spring configured to provide a variable spring rate.

At low arm angles the radial force may be increased by including radial booster springs as described above with reference to FIGS. 4A and 4B. Additionally or alternatively, a variable rate spring may be applied axially to the sliding support members 8, 9 and/or radially to each arm assembly, to provide an increased spring force at small angles between the longitudinal axis and an arm of the arm assembly where the mechanical advantage is reduced, and a decreased spring force at large angles between the longitudinal axis and an arm of the arm assembly where the mechanical advantage is increased. For example, a variable pitch coil spring may be provided axially to the sliding support members 8, 9, and/or radially between an arm 5, 6 and the mandrel 16, so that the spring rate increases as the coil spring is compressed. A variable pitch spring is illustrated in FIG. 12. A variable rate spring may be designed so that the varying spring rate in combination with the varying mechanical advantage provided by the arm assemblies achieves a constant radial force for a range of well bore diameters. However, centralisation at low angles presents difficulties even with variable rate springs. At low angles, large changes in wellbore diameter cause only a very small change in axial displacement of the support members 7, 8. Consequently, deflection of one arm assembly is poorly transferred via axial deflection of the support members to the other arm assemblies and the arms do not deflect in unison. When this occurs the device no longer acts to centralise the tool, the arms acting independently of each other. Extreme high precision tolerancing between parts is required to ensure all arms deflect in unison to achieve centralisation. Machining tolerances required to achieve centralisation at low arm angles may be impractical.

In one embodiment, the arm assemblies are configured so that the angle A between the third arm 7 and the longitudinal axis remains in a range of about 30 degrees to 60 degrees. The angle is preferably much greater than 10 degrees and much less than 75 degrees. The angle is preferably maintained in a range of 20 to 70 degrees, or more preferably 25 to 65 degrees. In the illustrated embodiment, a distance between the first and third pivot axes is greater than a distance between the third and fifth pivot axes, and a distance between the second and fourth pivot axes is greater than a distance between the fourth and fifth pivot axes, such that the angle B between the first arm and the longitudinal axis, and the angle C between the second arm and the longitudinal axis is less than the angle A between the third arm and the longitudinal axis. However, angles B and C may be the same as or greater than angle A. It is preferable for the angle B and angle C to be less than angle A to enable the centraliser to transverse from a larger diameter to a smaller diameter bore.

Figure 13A:
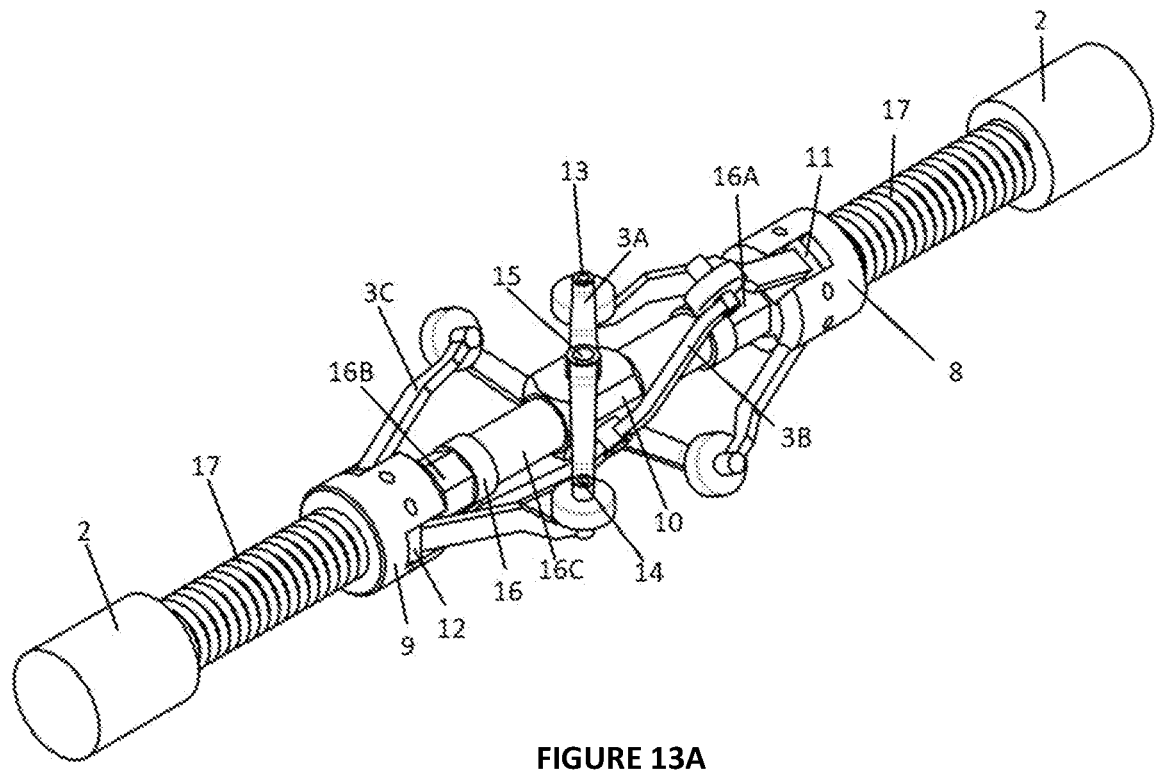
FIGS. 13A and 13B show a centraliser similar to the centraliser of FIGS. 2A to 2G but with the mandrel comprising a polygon shaped outer surface.

As described above with reference to FIG. 8, in some embodiments one or more of the support members 8, 9, 10 may be keyed to the mandrel 16 to rotationally fix the support member(s) to the mandrel. FIG. 13A illustrates another embodiment of a centraliser with the first and second support members 8, 9 keyed to the mandrel 16 to rotationally fix the support members to the mandrel. The mandrel 16 of the centraliser will often be hollow to accommodate wiring and the external wellbore pressures in the wellbore can be very high, for example 30,000 psi. A keyway groove in the mandrel will cause a 'stress riser' (increased local stress) in the mandrel 16 which may result in the mandrel collapsing under pressure. To reduce an increased stress in the mandrel the keyway may be provided to the support members 8, 9, 10 with a corresponding key or rail on the mandrel, as in the embodiment of FIG. 8. However, the necessary radial height of the keyway may be difficult to accommodate in the support members 8, 9, 10 and/or the radial height of the key on the mandrel requires significant additional machining of material in the manufacture of the mandrel. To address these issues, in some embodiments and as shown in FIG. 13A, the keying of the support members to the mandrel is provided by the mandrel having a plurality of facets (flat surfaces) spaced apart around an outer surface of the mandrel. Each facet extends for at least a portion of the length of the mandrel on which the first and/or second support member moves. The support members 8, 9 have a corresponding plurality of facets spaced apart around an inner surface of the support member, to rotationally key the support members to the mandrel to prevent rotation and allow the support members to slide or move axially on the mandrel. Each facet may be tangential to a circular curve centred on the central longitudinal axis of the mandrel/device.

Providing a multi-faceted surface to the mandrel avoids a stress riser caused by a keyway in the mandrel and requires less radial height for a keyway to be accommodated in the support members.

Figure 13B:
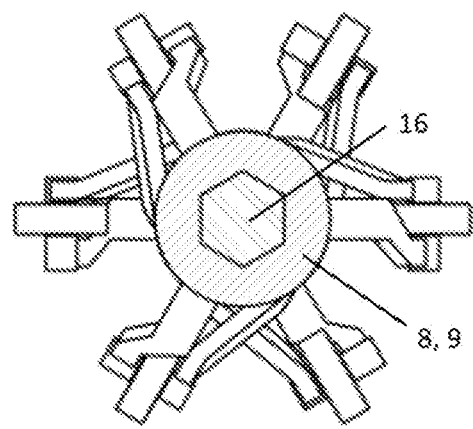

In the illustrated embodiment of FIG. 13A, the facets are arranged to provide the mandrel 16 with a polygon shaped outer surface with the support members 8, 9 having a corresponding polygon shaped inner surface to rotationally key the support members to the mandrel to prevent rotation and allow the support members to slide or move axially on the mandrel. FIG. 13B shows the facets and polygon shaped outer surface of the mandrel 16 and the corresponding polygon shaped inner surface of one of the first and second support members 8, 9. In the embodiment of FIG. 13A the polygon is hexagonal however one skilled in the art will appreciate other polygon shapes are possible, with more or less facets than six sides. It is envisaged that the mandrel and support member(s) may have at least two facets (e.g. diametrically opposed) to key the mandrel and support member(s) together. However, in a preferred embodiment, the outer surface of the mandrel has a facet azimuthally aligned with an adjacent first or second pivot joint 11, 12 at the first or second support member. Alternatively, or additionally, the mandrel 16 may have a facet extending between adjacent first or second pivot joints 11, 12, such that the number of facets is equal to the number of arm assemblies 3 or twice the number of arm assemblies 3. For example, in the illustrated embodiment comprising three arms, the mandrel comprises six facets, or a hexagonal outer shape associated with each sliding support member 8, 9. By example, a centraliser comprising four arm assemblies may have a mandrel with an octagonal shaped outer surface and with the first, second and/or third support member having a corresponding octagonal shaped inner surface.

Figure 8:
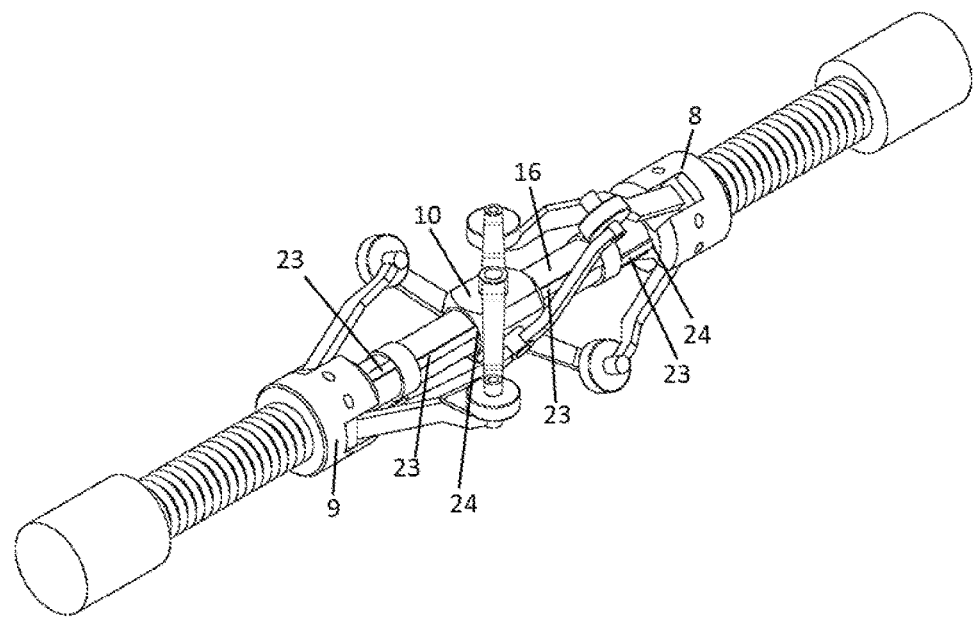
FIG. 8 is an isometric view of a centraliser similar to the centraliser of FIGS. 2A to 2G but additionally with support members of the arm assemblies rotationally keyed to the centraliser mandrel.

In the embodiment of FIG. 8, the first, second and third support members are keyed to the mandrel. However, in the embodiment of FIG. 13A, the first and second support members are keyed to the mandrel and the third support member is rotationally unkeyed (not keyed) to the mandrel. The mandrel has a first portion 16A corresponding with the first support member 8, a second portion 16B corresponding with the second support member 9, and a third portion 16C corresponding with the third support member 10. Each of the first and second portions of the mandrel comprise a plurality of facets to key the respective support member to the mandrel. The third portion 16C is cylindrical without facets. Although the third support member is unkeyed to the mandrel, the keying of the first and/or the second substantially maintains the relative rotational position of the third support member on the mandrel. In the illustrated embodiment, the first and second pivot axes of the first and second pivot joints 11, 12 are parallel to an adjacent facet.

One skilled in the art will appreciate that the third portion 16C of the mandrel may also include a facetted outer surface to key the third support member in the mandrel. In such an embodiment, facets in the third portion 16C may be rotationally offset from the facets in the first and second portions 16A, 16B, so that the first and second pivot axes of the first and second pivot joints 11, 12 are parallel to an adjacent facet, and the fifth pivot axis of the fifth pivot joint 15 is orthogonal to an adjacent facet. The facets of the third portion 16C of the mandrel may be rotationally offset from the facets of the first and second portions 16A, 16B by half of the internal angle of the polygon shape of the mandrel portions 16A, 16B, 16C. For example, in an embodiment comprising three arm assemblies, the facets of the third portion 16C of the mandrel may be rotationally offset from the facets of the first and second portions 16A, 16B of the mandrel by 30 degrees, the first, second and third mandrel portions having a hexagonal shape and hence an internal angle of 60 degrees.

In the illustrated embodiment, a portion of the mandrel located between the first and third support members 8, 10 and a portion of the mandrel located between the second and third support members 9, 10 each has a larger outer cross section than the faceted portions of the mandrel to provide mechanical stops to set a maximum diameter for the centraliser. Each stop limits axial movement of the respective first and second support member 8, 9 to limit the radial outward movement of the arm assemblies.

The facetted surface(s) of the mandrel and support member(s) achieves keying of the support member(s) to the mandrel while being stronger and also requiring less material to be machined from a stock material during manufacture of the mandrel.

One skilled in the art will understand that a mandrel with a polygon shaped outer surface has a cross section with a constant polygon outer shape extending for at least a portion of the length of the mandrel. Likewise, a support member with a polygon shaped inner surface has a cross section with a constant polygon inner shape extending for a length of the support member.

A centraliser according to one aspect of the present invention as described above provides one or more of the following benefits. The arm assemblies 3 each comprising the third arm 7 (the rocker arm) ensures the centraliser and tool string is directly centralised in the wellbore by the third arm 7 extending across the wellbore so that each arm assembly (preferably wheels of each arm assembly) contacts opposite sides of the wellbore. The centraliser also can 'bridge across' large diameter wellbore sections while continuing to centralise a sensor. The centraliser can be configured to achieve a relatively constant radial force for a relatively large range of wellbore diameters. The configuration of the pivot joints allows a centraliser to provide a radial centering force that is not so high as to result in excess friction in smaller diameter bores within the desired wellbore range, yet provides sufficient radial force to maintain the centraliser and associated tool string centrally within larger diameter bores. A balancing of the practical mechanical advantage together with an axial spring force allows for a centraliser that can centre the tool string even in deviated wellbores where the weight of the tool string and centraliser acts against the centralisation radial force provided by the centraliser. Furthermore, the centraliser is a passive device, with energisation being provided by the mechanical spring components 17 only. No other power input, such as electrical or hydraulic power provided from service located power units is required. The invention therefore provides a lower cost, effective, and simplified device that provides improved operational reliability and accuracy of logged data.

The invention has been described with reference to centrering a tool string in a wellbore during a wireline logging operation. However, a centralising device according to the present invention may be used for centering a sensor assembly in a bore in other applications, for example to center a camera in a pipe for inspection purposes.

Although this invention has been described by way of example and with reference to possible embodiments thereof, it is to be understood that modifications or improvements may be made thereto without departing from the spirit or scope of the appended claims.

The invention claimed is:

1. A device for centering a sensor assembly in a bore, the device comprising:
    three or more arm assemblies spaced circumferentially apart around a central longitudinal axis of the device, each arm assembly comprising:
        a rocker arm mounted to pivot about a rocker arm pivot axis coincident with and orthogonal to the central longitudinal axis of the device, the rocker arm extending through a plane in line with the rocker arm pivot axis and the central longitudinal axis, and
        a wheel at or adjacent to each end of the rocker arm, the wheels located on opposite sides of the plane equidistance from the rocker arm pivot axis, and
    one or more springs to bias the arm assemblies radially outwards so that in use the wheels of each arm assembly contact opposite sides of the bore to center the sensor assembly in the bore.

2. The device as claimed in claim 1, wherein the device comprises:
    a support member configured to move axially along the central longitudinal axis, and
    each arm assembly comprises a trailing arm pivotally connected between the support member and an end of the rocker arm so that axial movement of the support member towards the rocker arm pivot axis moves the arm assemblies radially outwards.

3. The device as claimed in claim 1, wherein the device comprises a central support member and the rocker arms are pivotably connected to the central support member, and wherein the central support member is configured to move axially along the central longitudinal axis.

4. The device as claimed in claim 1, wherein the rocker arm pivot axis is orthogonal to the central longitudinal axis.

5. The device as claimed in claim 1, wherein each rocker arm is rotationally symmetrical about the rocker arm pivot axis.

6. The device as claimed in claim 1, wherein each arm assembly is rotationally symmetrical about the rocker arm pivot axis.

7. The device as claimed in claim 1, wherein the plane is a first plane, and each wheel is positioned to contact the bore wall on a second plane coincident with the central longitudinal axis of the device and orthogonal to the first plane.

8. The device as claimed in claim 1, wherein the device comprises:
a first support member and a second support member axially spaced apart along the central longitudinal axis of the device, one or both of the first and second support members configured to move axially along the central longitudinal axis, and
each arm assembly comprises:
a first arm pivotally connected between the first support member and an end of the rocker arm, and
a second arm pivotally connected between the second support member and an opposite end of the rocker arm,
so that axial movement of one or both of the first and second support members towards the rocker arm pivot axis moves the arm assemblies radially outwards.

9. The device as claimed in claim 8, wherein:
the first arm is pivotally connected to the first support member by a first pivot joint having a first pivot axis,
the second arm is pivotally connected to the second support member by a second pivot joint having a second pivot axis,
the rocker arm is pivotally connected to the first arm by a third pivot joint having a third pivot axis, and the rocker arm is pivotally connected to the second arm by a fourth pivot joint having a fourth pivot axis, and
the rocker arm extends through the plane between the third pivot axis and the fourth pivot axis.

10. The device as claimed in claim 9, wherein the third pivot axis is located on a first side of the plane, and the fourth pivot axis is located on an opposite second side of the plane.

11. The device as claimed in claim 10, wherein the first pivot axis is located on the first side of the plane, and the second pivot axis is located on the opposite second side of the plane.

12. The device as claimed in claim 9, wherein the rocker arm pivot axis is located midway between the third and fourth pivot axes.

13. The device as claimed in claim 9, wherein a distance between the first and third pivot axes is greater than a distance between the third and rocker arm pivot axes, and a distance between the second and fourth pivot axes is greater than a distance between the fourth and rocker arm pivot axes.

14. The device as claimed in claim 9, wherein each wheel is rotationally mounted on an axis of rotation perpendicular to the central longitudinal axis of the device at or adjacent to the respective third and fourth pivot axes.

15. The device as claimed in claim 9, wherein the wheels are rotationally mounted to the respective first and second arms.

16. The device as claimed in claim 9, wherein
the one or more springs act on the first support member and/or the second support member to bias the first and second support members axially together and the arm assemblies radially outwards, and/or
wherein the one or more springs comprises leaf springs acting between the first support member and the first arm and/or the second support member and the second arm.

17. The device as claimed in claim 9, wherein the one or more springs are configured together with an angle (A) between a line extending through the third and fourth pivot axes and the central longitudinal axis so that the arm assemblies each provide a substantially constant radial force for a range of bore diameters.

18. The device as claimed in claim 9, wherein the device is a passive device, with energisation of the arm assemblies radially outwards being provided by the one or more springs only.

19. The device as claimed in claim 1, wherein
radial extremities of the arm assemblies together present an outer diameter of the device, and
wherein the device comprises an adjustable mechanical stop mechanism to set a maximum outer diameter of the device within a range of maximum outer diameters so that the device is configurable for use in a predetermined range of bore diameters, and
the one or more springs are preloaded to bias the arm assemblies radially outwards so that the device supports the sensor assembly when the radial extremities are at the set maximum diameter.

20. The device as claimed in claim 1, wherein the device is adapted for centering a wireline logging tool string in a wellbore during a wireline logging operation.

* * * * *